United States Patent
Kroghrud

[11] Patent Number: 5,934,440
[45] Date of Patent: Aug. 10, 1999

[54] CONVEYOR DEVICE FOR INSPECTING CONTAINERS AND TRANSPORTING THEM TO SELECTED DESTINATIONS

[75] Inventor: Helge Kroghrud, Asker, Norway

[73] Assignee: Tomra Systems ASA, Asker, Norway

[21] Appl. No.: 08/973,345

[22] PCT Filed: Jul. 10, 1997

[86] PCT No.: PCT/NO97/00180

§ 371 Date: Dec. 1, 1997

§ 102(e) Date: Dec. 1, 1997

[87] PCT Pub. No.: WO98/02853

PCT Pub. Date: Jan. 22, 1998

[30] Foreign Application Priority Data

| Jul. 12, 1996 | [NO] | Norway | 962947 |
| Jul. 12, 1996 | [NO] | Norway | 962948 |
| Jul. 12, 1996 | [NO] | Norway | 962949 |
| Apr. 24, 1997 | [NO] | Norway | 971888 |

[51] Int. Cl.[6] ............ B07F 7/00; B65G 47/10; B65G 47/46; B07C 5/34
[52] U.S. Cl. ............ 194/212; 198/570.07; 198/379; 198/395; 209/524; 209/538; 209/583; 209/587
[58] Field of Search .................. 194/208, 209, 194/212, 213; 198/370.07, 379, 395; 209/583, 587, 524, 538, 540

[56] References Cited

U.S. PATENT DOCUMENTS

| 843,519 | 2/1907 | Crane | 198/370.07 |
| 5,361,913 | 11/1994 | Melchionna | 194/209 |
| 5,641,072 | 6/1997 | Otake | 209/524 |

*Primary Examiner*—F. J. Bartuska
*Assistant Examiner*—Bryan J. Jaketic
*Attorney, Agent, or Firm*—Rodman & Rodman

[57] ABSTRACT

A device for conveying, lifting and rotating containers (521; 522; 523), (510) are conveyed in lying position past a detector (515) in order to inspect characteristic data regarding the containers, and means (124; 538) which, on the basis of such data, determines how the containers are to be handled. Along a first and a second longitudinal side (510'; 510") of the conveyor (510) there are provided respectively a first and a second rotatable roll (511, 512), wherein the rolls can be made to rotate with the aid of respective first and second roll driving motors (513, 514) about their longitudinal axis in the same direction of rotation. On co-ordinated movement, the rolls are moveable in the horizontal and optionally the vertical direction relative to the conveyor, whereby the rolls are displaceable to a first position wherein the lie substantially laterally outward relative to the container transport path of the conveyor (510), a second position wherein they are located above the conveyor and displaced towards each so as to be spaced apart at a distance (d) which is smaller than the width of the conveyor, and a third position wherein the rolls are spaced apart at a third distance which is smaller than or equal to said second distance. The detector (515) is a bar code reader located at a distance above the conveyor (510). The rolls (511, 512) are arranged to lift the container up from the conveyor and rotate the container about its longitudinal axis, so that a bar code can be read by the bar code reader (515).

16 Claims, 23 Drawing Sheets

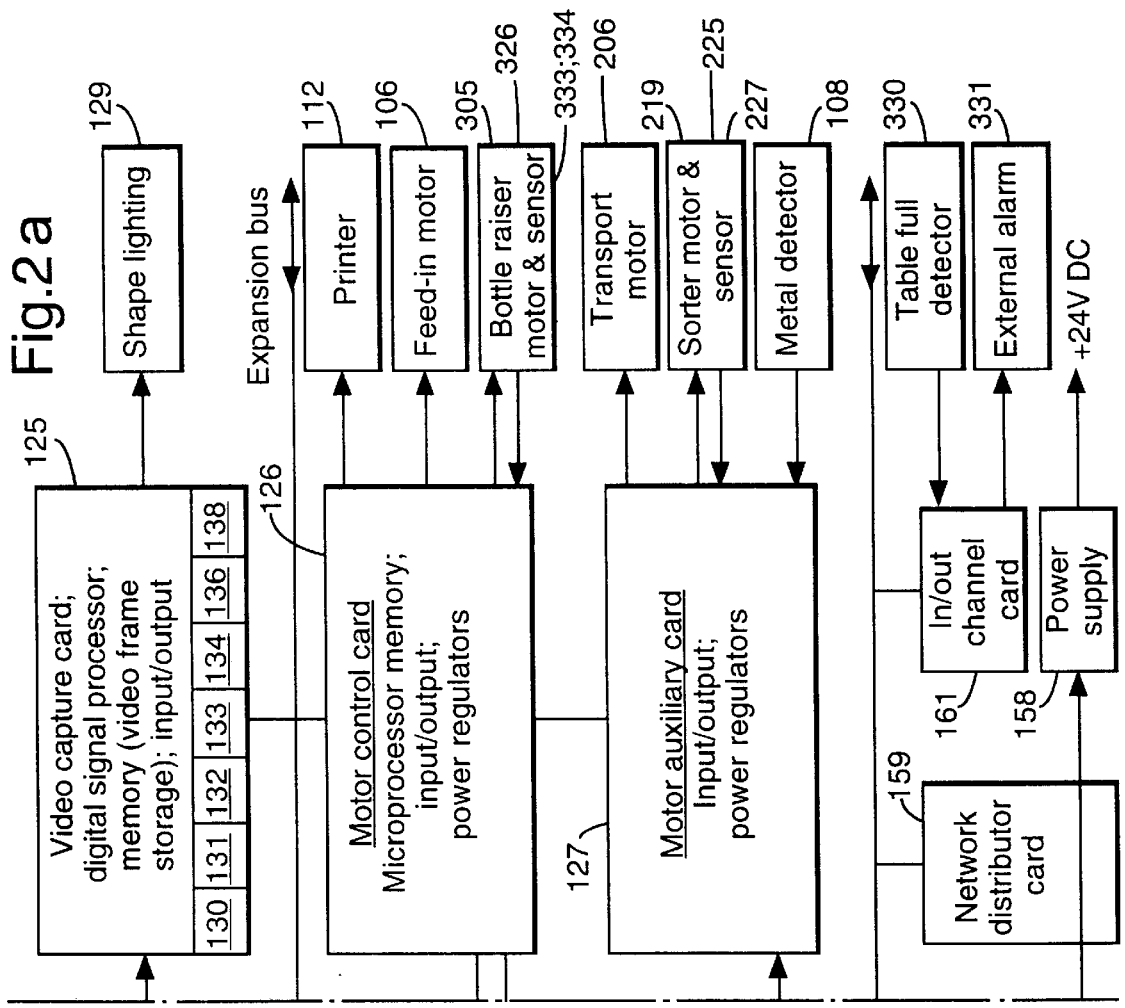

CONVEYOR DEVICE FOR INSPECTING CONTAINERS AND TRANSPORTING THEM TO SELECTED DESTINATIONS

BACKGROUND OF THE INVENTION

The present invention relates to a device for handling containers, e.g., cans made of glass, plastic, wood or metal, or bottles of glass or plastic, wherein the containers with the aid of a conveyor are conveyed in lying position past a detector in order to inspect characteristic data about the containers, and means which, on the basis of such data, determines how the containers are to be handled subsequently, e.g., sorted for removal from the conveyor, or conveyed further to the downstream end of the conveyor, and wherein the conveyor has first and second rotatory roller units, a first driving motor being connected to a first of the roller units to cause rotation thereof about its axis of rotation and thereby rotation of the second roller unit about its axis of rotation, by movement of belts or bands which extend continuously about and between the roller units. When inserted into the apparatus, such containers are preferably empty and may have served as storage for foodstuffs, e.g., beverages, or other usable contents.

It has previously been known to use controllable pushers which operate transverse to the conveyor belt, so that the containers are pushed off the belt and onto a second conveyor or directly into a receptacle means. A solution of this kind is technically complex, requires a great deal of equipment and is not suitable for handling all types of containers.

There has therefore long been a desire to provide a simple sorting device, especially for the cases where there is a need for sorting out to two or three exits.

SUMMARY OF THE INVENTION

According to the invention, the device is characterised in:

that a plurality of adjacently disposed, continuous elastic belts or bands run in grooves on the roller units;

that along a first and a second longitudinal side of the conveyor there are provided respectively a first and a second rotatable roll, wherein the rolls can be made to rotate with the aid of respective first and second roll driving motors about their longitudinal axis in the same direction of rotation, and wherein the rolls on coordinated movement are moveable in the horizontal and optionally in the vertical direction relative to the conveyor, whereby the rolls are displaceable to a first position wherein they lie substantially laterally outward relative to the container transport path of the conveyor and are spaced apart at a first distance, a second position wherein they are located above the conveyor and displaced towards each other so as to be spaced apart at a second distance which is smaller than the width of the conveyor, and a third position wherein the rolls are spaced apart at a third distance which is smaller than or equal to said second distance;

that the detector is a bar code reader located at a distance above the conveyor; and that at a distance above the conveyor there is also provided a motor-driven sideways displacer for the containers, wherein the displacer consists of a laterally displaceable suspension on which is secured a substantially downward directed pair of plates, wherein the plates are spaced apart at a distance at least equal to the width of the conveyor.

According to further embodiments of the device, the rolls are mounted on a pair of arms which, when the rolls above the conveyor are positioned so as to be spaced apart at second distance with the aid of a motor-driven arm rotation mechanism, lift the container up from the conveyor and, on rotation of the rolls, cause the container to rotate about its longitudinal axis, so that a bar code located on the container can be read by the bar code reader.

Each of the roller units is preferably made having a double-cone configuration, a so-called "diabolo" shape.

The rolls are preferably driven by respective internally mounted motors.

Furthermore it would be advantageous to allow said belts or bands to have a circular, rectangular, triangular or polygonal cross-section.

In a special and preferred embodiment, the device can be a part of a transport path for containers in a reverse vending apparatus. Data concerning the shape and/or colour and/or material type of the container will in this case be registered by the reverse vending apparatus upstream in the transport path in relation to the conveyor of the device.

The said data concerning the container and its bar code data are supplied to a processor in order to determine by processing therein whether the container is to be fed on towards the downstream end of the conveyor or laterally displaced away from the conveyor, and whether the container is associated with a refundable deposit, is recyclable, is to be compacted or in another manner further treated.

DESCRIPTION OF THE DRAWINGS

The invention will now be described in more detail with reference to the appended drawings.

DETAILED DESCRIPTION OF THE INVENTION

Figure 1:
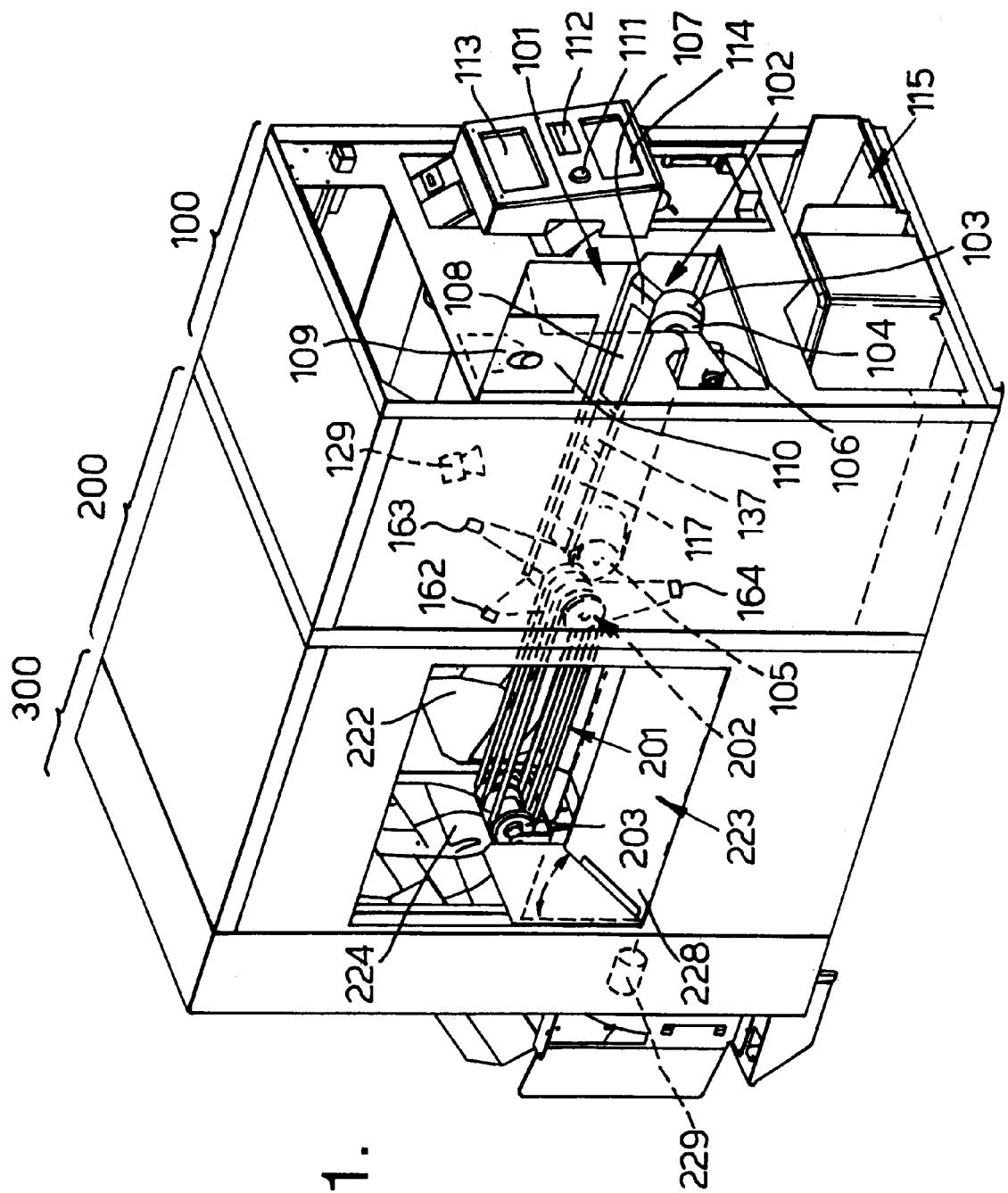
FIG. 1 shows a reverse vending apparatus for use with the present invention.

FIG. 1 shows a reverse vending apparatus where certain parts, inter alia, the front panel, have been removed in order to make some details more visible. The reverse vending apparatus consists of three main sections 100, 200 and 300. The main section 100 has an insertion opening 101, wherein containers, such as empty bottles of glass or plastic, optionally containers in the form of empty cans made of glass, plastic, metal or wood, can be placed on a V-shaped conveyor 102 consisting of an inclined conveyor belt 103 which is driven over a pair of rollers 104, 105 by means of a motor 106. The V-shaped conveyor also has an inclined, stationarily positioned sliding surface 107. The sliding surface may be equipped with a metal detector 108. A video camera 109 is placed such that it looks down towards the conveyor 102, for example, through a window or opening 110. The reverse vending apparatus will be especially useful in connection with the payment of return deposits, where a user will be able to insert containers onto the conveyor 102 and request a receipt for the accepted containers by pushing a control button 111. A receipt will then be supplied via an opening in a printer 112, so that the receipt can be exchanged for cash. Alternatively, the printer can be replaced by a coin dispenser. As a further alternative or supplement, a device is conceivable wherein the apparatus user can selectively determine that the return deposits are to be donated to a charity, e.g., the Red Cross, SOS-Kinderdorf, the Salvation Army or the like.

To direct a user of the apparatus, it will be advantageous to use at least one display 113. However, in addition there can be provided, e.g., a further display 114. Both the displays can, e.g., be of the LCD type. In those cases where it is desirable to return a container to the apparatus user, there is located in the front portion of the section 100 a return opening 115 which communicates with the section 200 where sorting out can take place.

The section 100 may further contain a loudspeaker 116 for signalling messages to the user of the reverse vending apparatus or to give audio signals which summon the attention of the user or the maintenance staff.

In order to detect whether a container is inserted into the reverse vending apparatus with some contents, e.g., residual liquid, or contains other foreign bodies, there may be provided, e.g., a load cell 117 arranged on the stationary part 107 of the conveyor 102. However, as will be described below, there will also be other facilities for detecting whether a container that is inserted contains a substance, e.g., liquid, or not.

Figure 2:
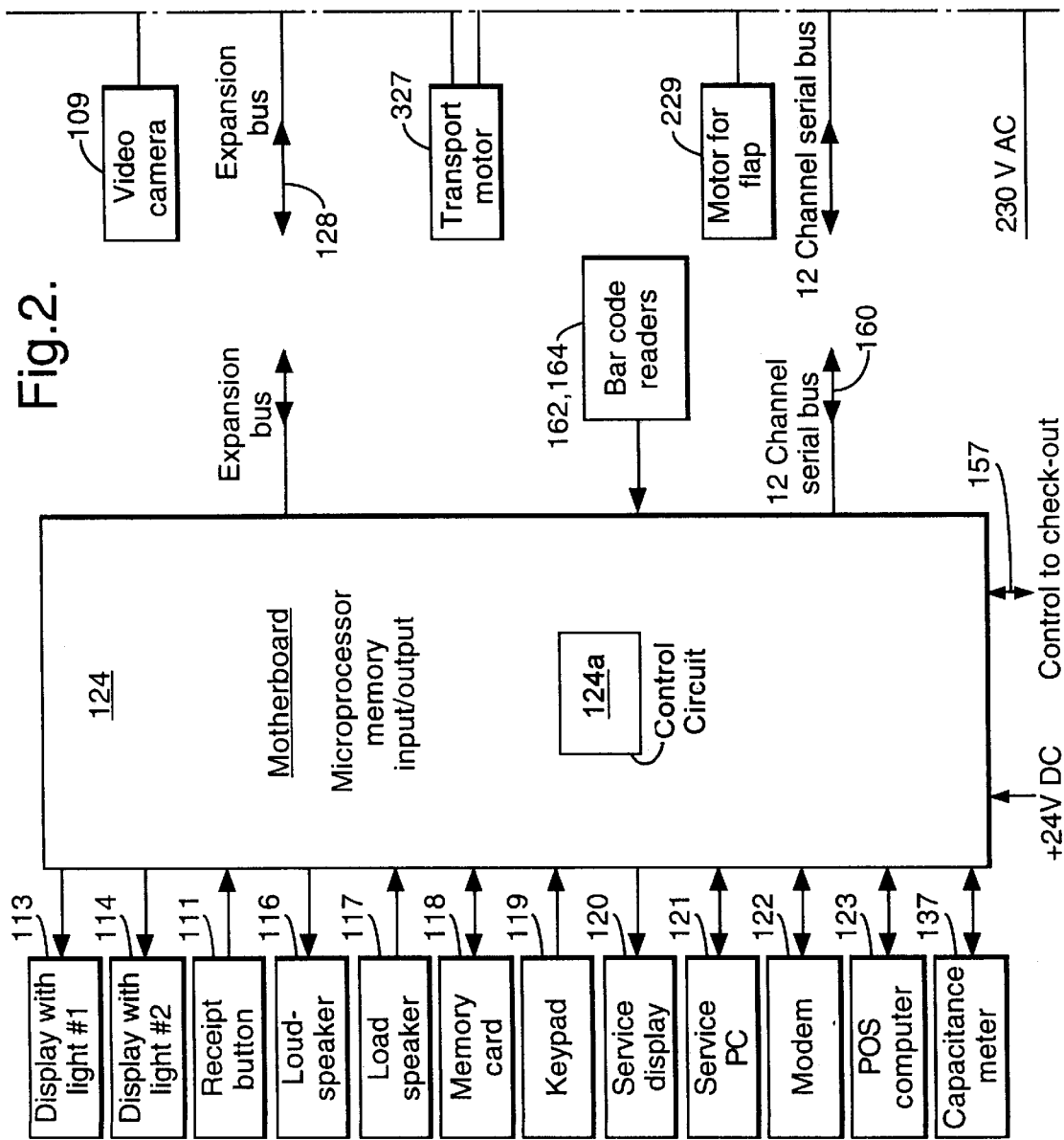
FIG. 2 shows in simplified block diagram form the circuit structure in a reverse vending apparatus as shown in FIG. 1.

To be able to ensure that there is an efficient handling of the apparatus in the event of faults or maintenance and system control, it would be advantageous to provide a memory card device 118 which makes it possible to exchange information with a computer in the apparatus by using special data cards. In this connection, it will also be necessary, for example, for testing, starting and stopping the reverse vending apparatus or other relevant operations, to provide the apparatus with a keypad 119. A display 120 for maintenance and repair staff can also be provided in the apparatus, preferably in section 100, in connection with a suitable computer 121. Conceivably, the reverse vending apparatus may also be connected to a modem, so that data can be tele-transmitted to and from the apparatus, e.g., in connection with fault reports or fault repair of simple faults. In FIG. 2 the modem is indicated by means of the reference numeral 122. Furthermore, it is possible to provide a point-of-sale (POS) computer 123 in the shop or the business location where the reverse vending apparatus is located. A computer of this kind might be useful for statistical purposes, communication with check-outs in a shop or supermarket, or to ensure that a receipt that is cashed in at a check-out cannot be cashed in again.

The said functional members 113, 114, 111, 116–123 are, as shown in FIG. 2, connected to a motherboard 124 which contains a microprocessor, a memory and input and output—units for data to and from the motherboard. The motherboard and thus also the said members 113, 114, 111, plus 116-123 are supplied with working voltage, e.g., +24 V DC via the motherboard. The motherboard 124 communicates with a video capture card 125, a motor control card 126 and a motor auxiliary card 127 via an expansion bus 128. The video capture card 125 receives input from the video camera 109. The video capture card may contain a digital signal processor, a video frame storage device, and means for input and output of data. The video capture card may be equipped with a lighting means 129 so as to be able to provide the right lighting in connection with the detection of the shape of a container.

Figure 3A:
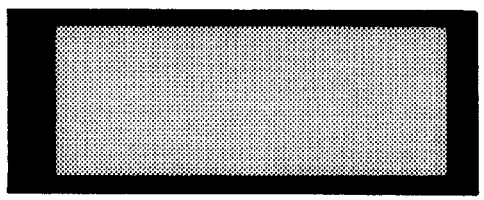
FIGS. 3a–g show typical video images in connection with a detector station in the reverse vending apparatus according to FIG. 1.
Figure 3B:
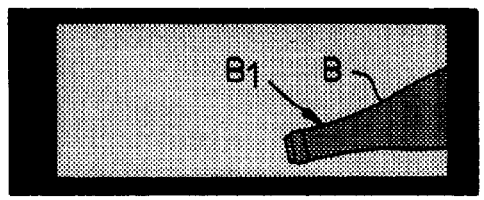
Figure 3C:
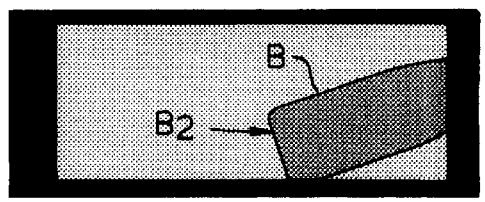

Broadly speaking, the video capture card 125 operates as a video picture analyser. Consequently, the video capture card 125 may have many functions, according to requirement in respect of what is to be analysed in the video image of the container which is captured by the video camera 109. According to the invention, the video capture card has an insertion analyser 130 which analyses the video image whilst the container is conveyed, in lying position and with its axis parallel to the direction of conveyance, past the video camera. Consequently, this insertion analyser may contain a calculator component and a control component. Before a container, e.g., a bottle, is put on the conveyor 102, the video camera 109 will show a video image essentially as shown in FIG. 3a. If the reverse vending machine is to function as intended, it is essential that the container is inserted bottom first. In FIG. 3b it is shown how an attempt is made to insert a bottle mouth (top portion or neck of bottle) first. When a container in the form of a bottle B is inserted top portion and neck B1 first, the calculator component in the insertion analyser 130 will thus first determine that the container in this case has been inserted incorrectly. The control component which is included in the analyser 130 will cause the container B to be fed back to the insertion portion of the reverse vending apparatus at the start of the conveyor 102. A signal will be given to the apparatus user that he should turn the container so that the bottom of the container B is inserted first on reinsertion. When the container is inserted bottom first, the video image will appear approximately as shown in FIG. 3c. The bottom of the container, in this case a bottle, is indicated by means of the reference B2.

It is important to note that video images are taken continuously for ongoing monitoring of the position of an inserted container and also to observe the insertion of any other containers. The most ideal video image is selected by a circuit 136 for further analysis with a view to recognition and identification of the container. Such image analysis is generally described in technical literature.

It will immediately be understood that the video picture of the container will have varying appearance, depending upon the appearance of the container. FIG. 3a thus merely serves as an example to elucidate essential features of the use of a video camera to obtain a number of characteristic features of a container which is fed past the video camera 109.

If the starting point for the insertion had been as shown in FIG. 3c, the calculator component would have calculated that the container was moving into the video with the container bottom B2 first, and thus cause the container to be conveyed further to a discharge station in either section 200 or section 300.

Figure 3D:
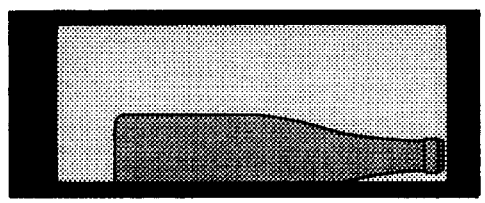

In FIG. 3d it is shown how the outer contour of the bottle is visible. The position which the container 3 has in the range of vision of the video camera is determined on the basis of the container's position in the video image. This can take place with the aid of a position detector 131 which constitutes a part of the video capture card. With the aid a position detector of this kind it is possible to establish where the container is relative to the length of the detection zone, at the same time as the position detector 131 indicates separation between containers that are inserted.

The video capture card 125 preferably includes a container shape calculation circuit 132. On the basis of the video picture of the container, the circuit 132 is capable of calculating a characteristic expression of the shape of the container, such as the container's contour, surface area, cross-section or the like.

In those cases where the container B is a bottle of glass or plastic, it would be expedient to illuminate the bottle, e.g., with the aid of the lighting unit 129. The video camera 109 may expediently be a black and white camera, but use of a colour video camera is also conceivable. If a colour video camera is used, a colour determination circuit 133 which is included in the video capture card 125 can be put to use. The video capture card 125 may also contain a bar code reader 134 which is adapted to scan continuously a field of the video image in order to look for and register a bar code located on the container, indicated by means of the reference numeral 135 in FIG. 3e. The bar code will in a number of cases give indirect information with regard to, e.g., the colour of the bottle, so that use of a black and white camera is sufficient. The video capture card may also include, in connection with the bar code reader 134, a circuit which causes the container to be conveyed back to the insertion portion 115 of the reverse vending apparatus if the microprocessor 124 does not accept the container because of the bar code reading made by the bar code reader 134.

As shown in FIG. 1, a small gap will occur between the conveyors 102 and 201, i.e., between respective rotatory rollers 105 and 202. Conventional bar code sensors 162, 163 and 164 may be located in the gap, and where each will cover an area of detection on the container equal to about 120°.

Figure 3E:
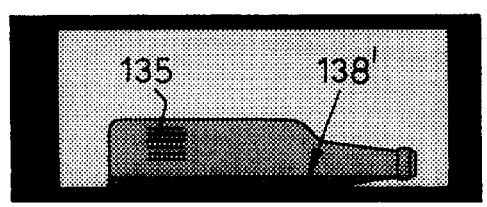

The reference numeral 138' in FIG. 3e denotes typical and possibly longitudinal markings in the video image of a container, which indicate that the bottle wholly or partly contains liquid. In the illustrated case a small residue is present in the bottle.

This can be registered by a subcircuit 138. Owing to the varying weight of the bottle, it will be crucial to supplement the video image analysis with a weighing by using the load cell 117, and also a capacitance meter 137.

Figure 3F:
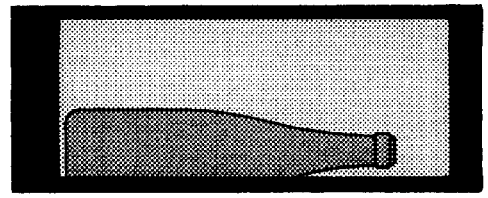
Figure 3G:
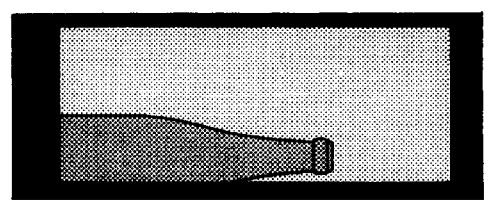

FIGS. 3f and 3g show the container, here in the form of a bottle, on its way out of the detection area.

The video capture card 125, with its subcircuits 130, 131, 132, 133, 134, 136 and 138, communicates with the motherboard 124 via the expansion bus 128, and the motor control card 126 is thus actuated via the motherboard 124. The same applies to the motor auxiliary card 127.

Figure 4:
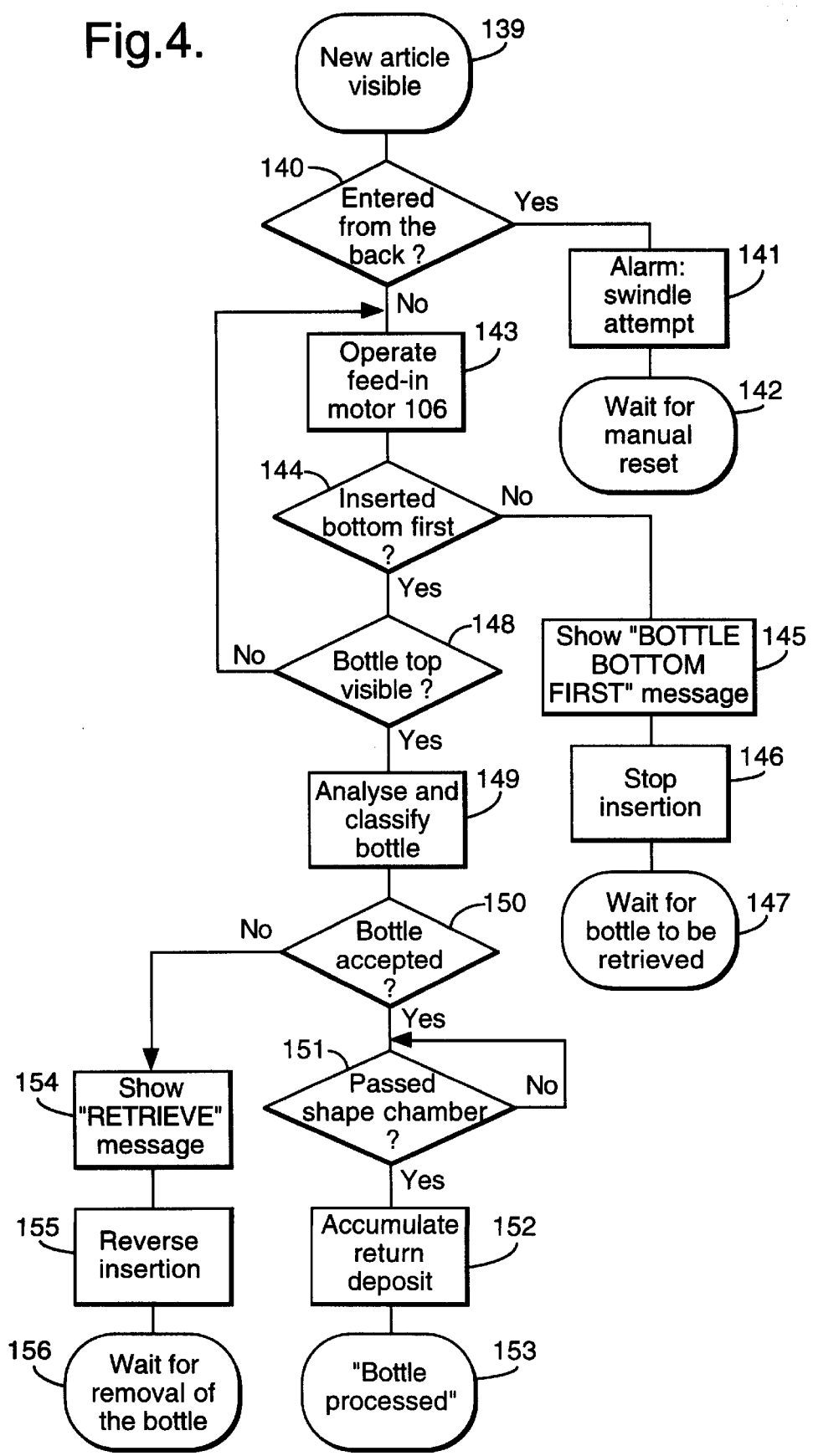
FIG. 4 is a simplified flow chart for a part of the detector function, according to the invention.
Figure 5:
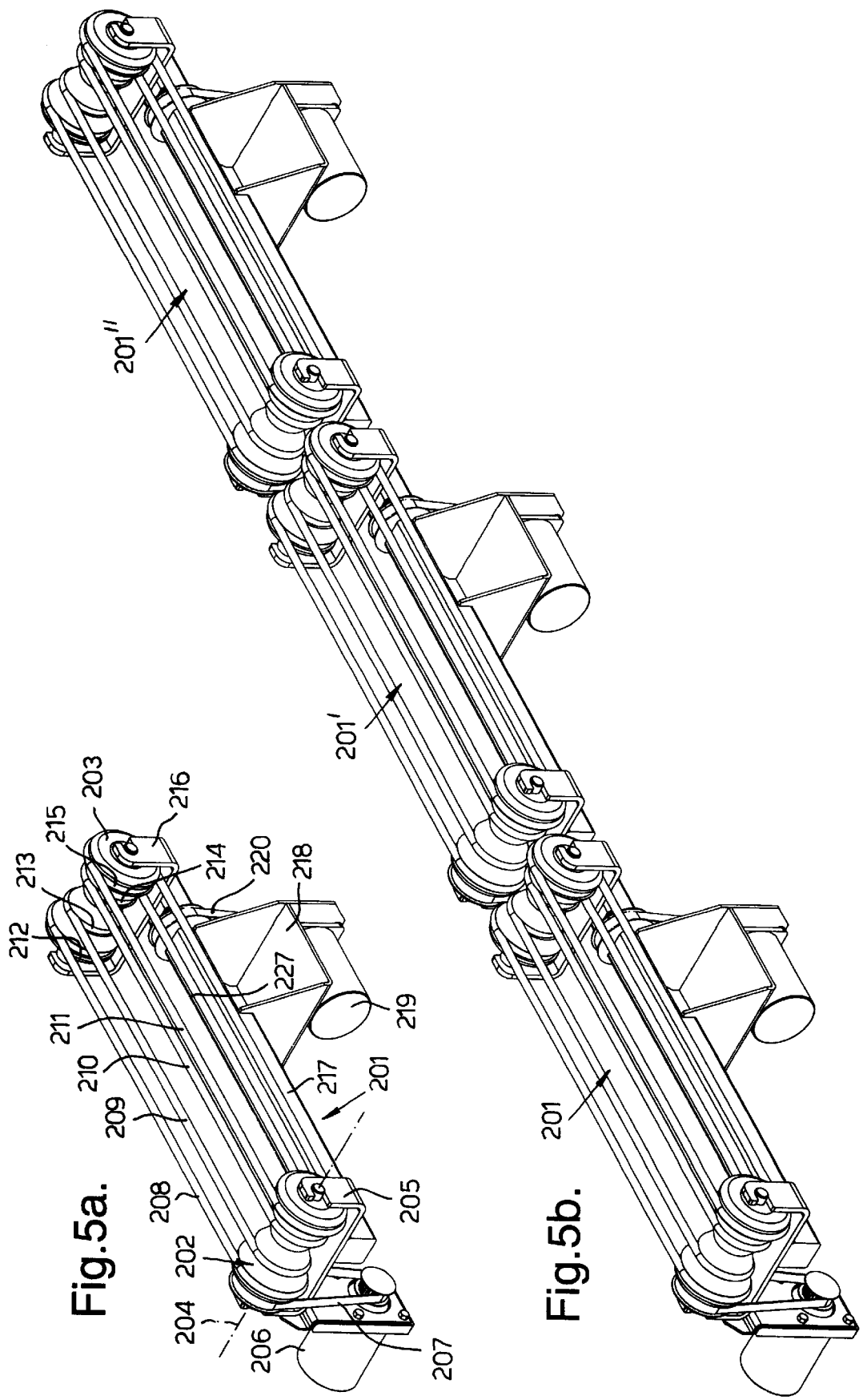
FIG. 5a and FIGS. 6, 7, 8 and 9 show a preferred sorting device for use in a reverse vending apparatus as shown in FIG. 1.
FIG. 5b shows a variant of the sorting device for increased sorting potential.

FIG. 4 shows a flow chart in connection with some of the detection functions attended to by the video capture card. At block 139 there appears a new article in the form of a container B, as shown in FIG. 3b or FIG. 3c. If someone tries to insert a container from the back of the machine, e.g., from section 200 or 300, block 140 will decide whether this happens or not. Thus, if a container is moved into the detection sector in such a way that it arrives from the left in the video images which are shown in FIG. 3, block 140 will emit an affirmative signal, which will set off an alarm at block 141 as an indication of attempted swindle. If this happens, the reverse vending apparatus will stop its function as shown in block 142, as in this case there must be a pause for the manual resetting of the reverse vending apparatus. If no attempt at swindle is made, so that the container, bottle or, e.g., can, is thus fed into the detection zone from right to left as shown in FIG. 3, the block 140 will emit a negative signal, which initiates at block 143 operation of insertion motor 106. In block 144 the insertion analyser 130 will decide whether the container is inserted bottom first. If this is not the case, a negative signal will be discharged from the block 144, which at block 145 initiates a message to the apparatus user to insert the container, in this example a bottle, "bottle bottom first". A message of this kind can, e.g., be shown on the display 113. Subsequently the insertion is stopped in that the motor 106 is stopped, as indicated by block 146. There is then a short pause whilst the apparatus user retrieves the container, that is, e.g., the bottle or can, for reinsertion, as is indicated by block 147. If it is established at block 144 that the container is inserted bottom first, an affirmative signal is emitted. Subsequently it is established at block 148 whether the container's top, in this case the bottle top portion, is visible or not. If the container top is not visible, as in FIG. 3d, a negative signal is emitted from the block 148, which via block 143 causes the insertion motor 106 to be run until the container top is visible. As further indicated by block 149 the container in this case is analysed and classified, e.g., by using one or more of the circuits 130–134 and 136, 138. If the container, e.g., a bottle, is deemed to be accepted, as indicated by block 150, an affirmative signal is emitted. At block 151 the digital signal processor in the video capture card 125 asks whether the container has passed the detection area or the shape chamber. If the container has come as far in the video image as shown in FIG. 3g, the position detector 131 will emit an affirmative signal, which, as indicated at block 152, signals that the return deposit value is to be accumulated in the motherboard 124. Subsequently a "bottle processed" signal 153 is emitted.

If, after analysis and classification at block 149, a bottle or container is perceived as unacceptable in connection with block 150, a negative signal will go out from block 150 to a message block 154 which gives a "retrieve" message to the apparatus user. Furthermore, at block 155 the reversal of the insertion direction of the conveyor 102 will be initiated. There is then a pause, as indicated by block 156, for the removal of the container or bottle.

As is thus shown and described in connection with FIGS. 3 and 4, it will be understood that if a container, e.g., a bottle, is inserted incorrectly, i.e., mouth first, this will be detected in an efficient manner and measures likewise taken.

The section 200 of the reverse vending apparatus will now be described in more detail with reference to FIGS. 1, 2 and 5–9. This section of the apparatus is designed for sorting containers which are inserted and which pass through the section 100.

In FIG. 1 there is shown downstream of the conveyor 102 a further conveyor 201 which has a first rotatory roller unit 202 and a second rotatory roller unit 203. The first roller unit 202 has a stationary axis of rotation 204. The roller unit 202 is mounted in a fixed bracket 205. A first motor 206 is operatively connected to the roller unit 202 via a transmission 207. The motor 206 thereby causes rotation of the roller unit 202. Consequently, rotation of the second roller unit 203 is also effected in that a plurality of adjacently disposed elastic belts or bands 208, 209, 210 and 211 are provided, which run in grooves made for this purpose, such as the grooves 212, 213, 214 and 215 on the roller unit 203. The belts or bands 208–211 may, e.g., have a circular, rectangular, triangular or other polygonal cross-section. When the motor 206 rotates and moves the transmission 207 so that the first roller unit 202 rotates in its holder 205, the second roller unit 203 will rotate because of the movement of the conveyor belt 208–211. The second roller unit 203 is mounted in a holder 216.

Figure 6:
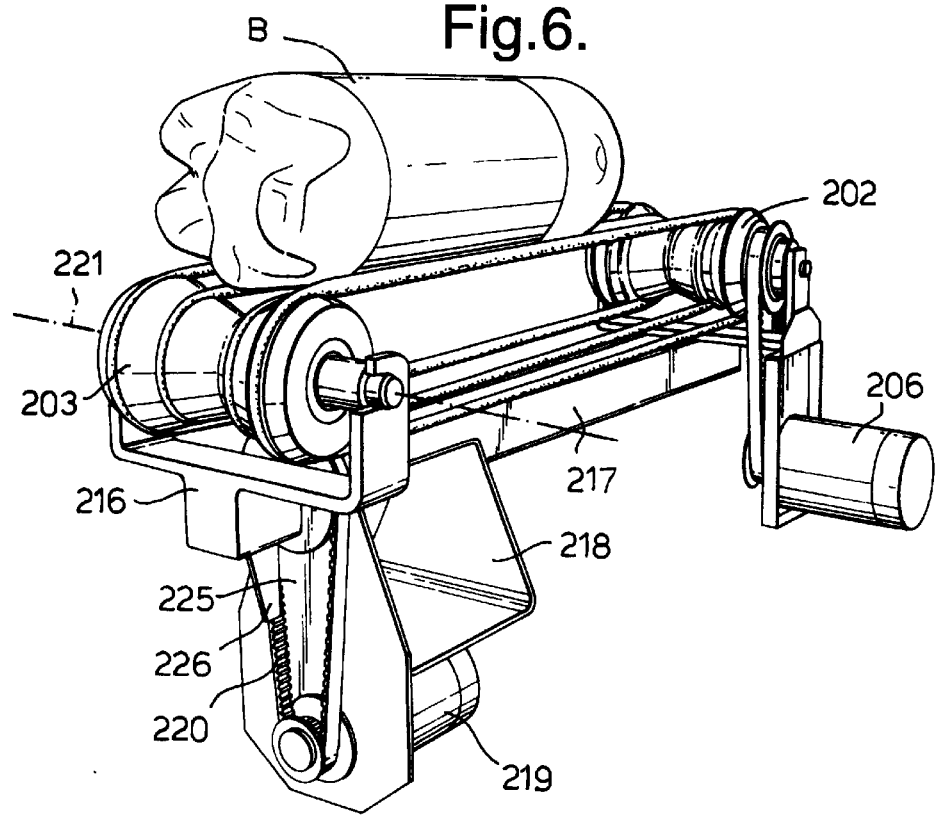

The conveyor 201 has a supporting frame 217 to which is secured a motor bracket 218 in which a motor 219 is suspended. The holder 216 is tiltable. The motor 219 will via a connection 220 be made capable of steering the tiltable holder 216 in one direction or another in a plane transverse to the conveyor 201 from a centre position (as shown in FIG. 6) where the axis of rotation of the second roller unit is parallel to the axis of rotation of the first roller unit. The axis of rotation of the second roller unit is in FIG. 6 denoted by the reference numeral 221.

Figure 7:
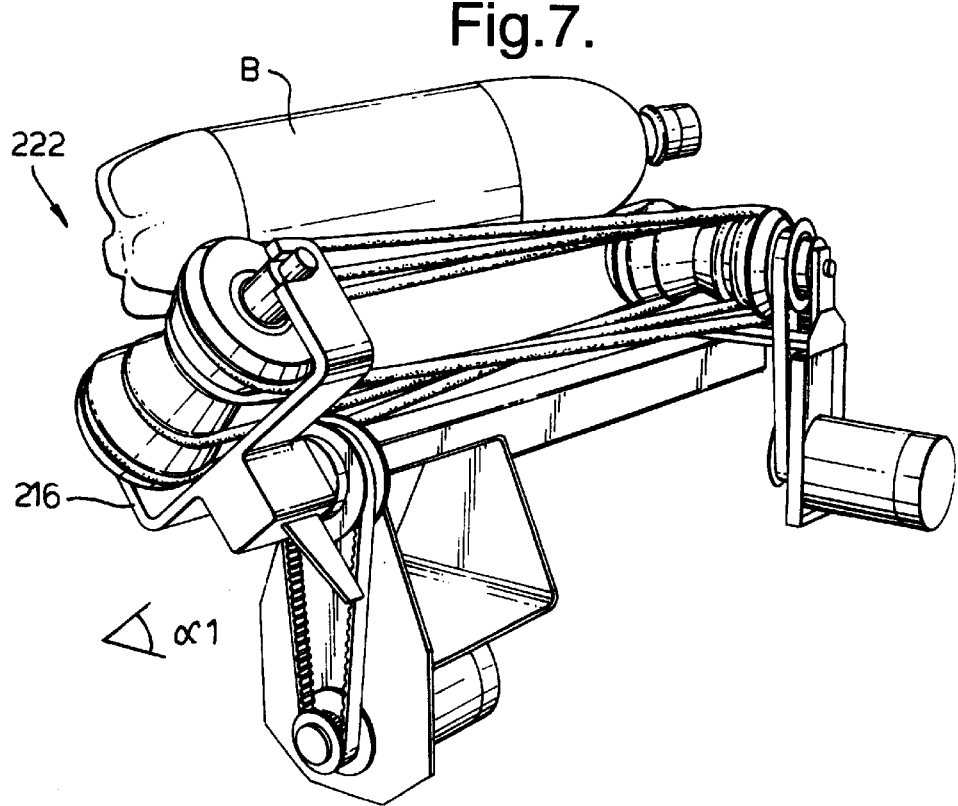
Figure 8:
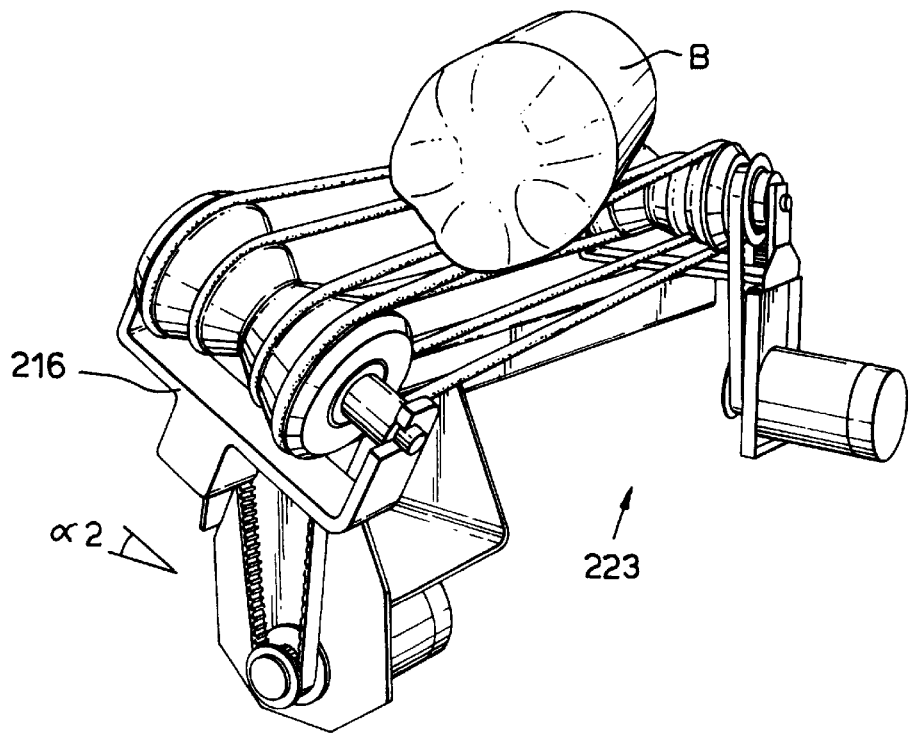
Figure 9:
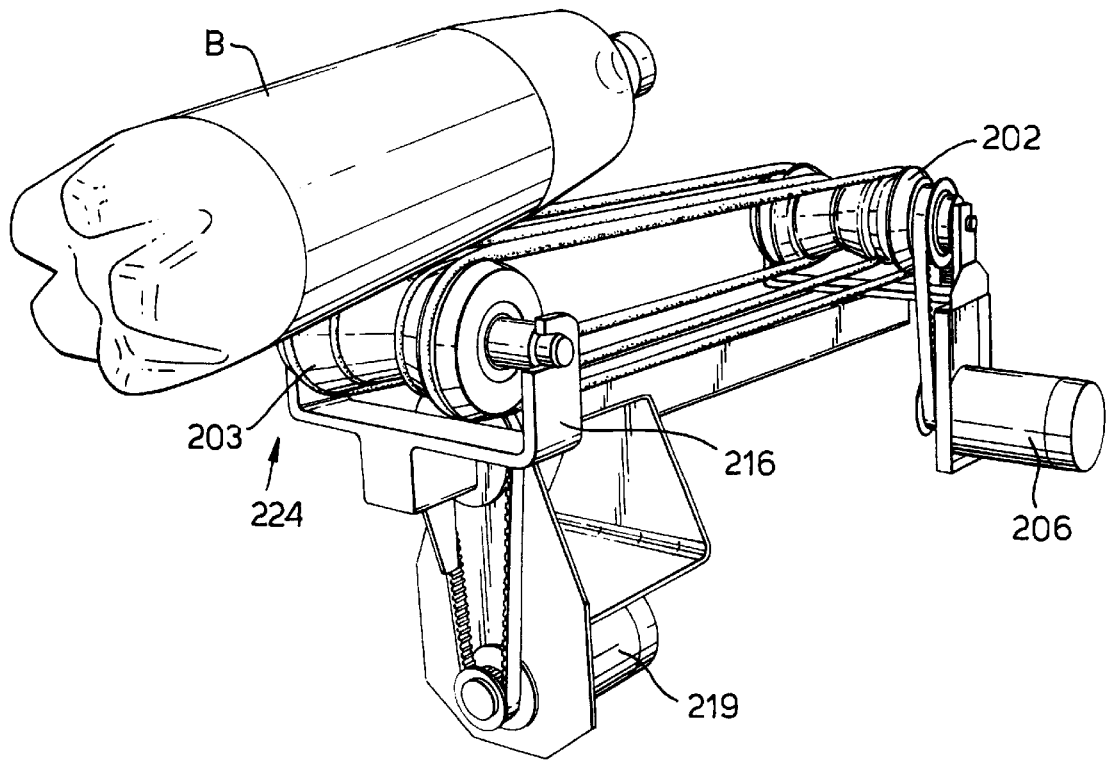

The detector unit, as represented by the motherboard 124 and the video capture card 125, contains a control circuit 124a, advantageously provided on the motherboard 124, which control circuit 124a, on the basis of data linked to the detectable container with a view to whether the container is to be sorted out in the station 200 or conveyed further, either actuates the second motor 219 to turn in order to tilt the second roller unit 203 holder 216 a certain angle ($\alpha 1; \alpha 2$) to one side or the other, as indicated in FIGS. 7 and 8 in order to cause a container of the type in question, e.g., B, which is lying on the conveyor 201 to be tipped to one side or the other to a first exit 222 as indicated in FIGS. 1 and 7, or to a second exit 223 as shown in FIG. 1 and indicated in FIG. 8. If the container, e.g., a bottle or a can, is not to be sorted out to the said exit 222 or 223, the container B is moved further at $\alpha 1 = \alpha 2 = 0°$, in that the motor 219 keeps the holder 216 still in the centre position as shown in FIG. 6, so that the container is caused to leave the conveyor 201 at a third exit 224 downstream of the second roller unit 203, i.e., at the entrance to the third section 300 (see FIG. 9). If containers are discharged to the first exit 222, these will be fed via a chute to the exit 115 in the first section 100. These may be containers which have a defect or which under no circumstances can be accepted by the apparatus. Containers which are discharged to the second exit 223 may, e.g., be metal cans such as aluminium cans which are to be carried further for compaction in any case and do not need to be fed to the section 300.

The exit 223 may conceivably contain a controllable flap 228 driven by a motor or actuator 229. The flap 228 will thus in reality serve as an extra container sorter at the exit 223. Corresponding flaps may optionally be provided at the exit 222 (not shown in FIG. 1).

As is shown in FIGS. 5–9, the roller units 202 and 203 preferably have a double-cone configuration, a so-called "diabolo" shape. The motors 206 and 219 are preferably stepping motors.

Containers of metal which contain metal, e.g., steel, metal cans which wholly or partly contain or consist of steel or containers which contain foreign bodies will normally be sorted out to the first exit 222 for return to the reverse vending apparatus user, as such containers normally will not be accepted because they can neither be compacted, further treated or recycled. These must therefore be dealt with in another way.

If there is an increased sorting requirement, and in addition there is sufficient space at the installation site, it will be possible to connect two or more conveyors 201 one after the other, as indicated in FIG. 5b by means of the reference numerals 201, 201', 201". The number of sorting exits will thus be $S = 2N+1$, wherein N is the number of conveyors.

Figure 10:
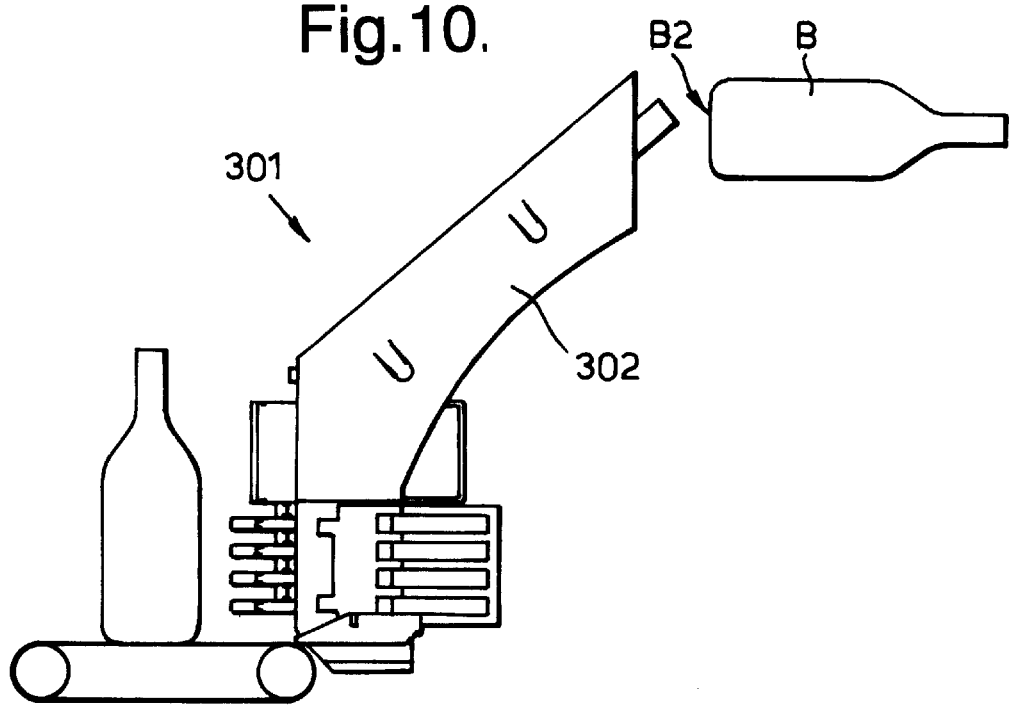
FIGS. 10–21 show details in connection with a bottle raiser which is a part of the reverse vending apparatus according to the invention.
Figure 11:
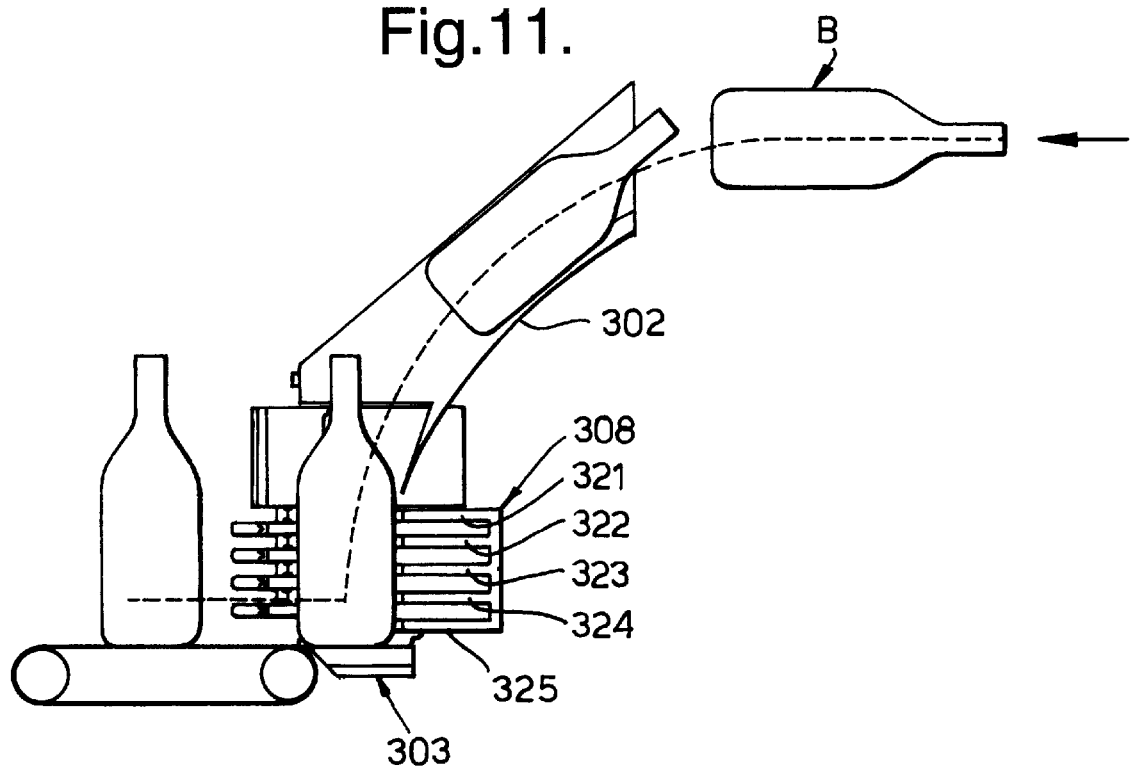
Figure 13:
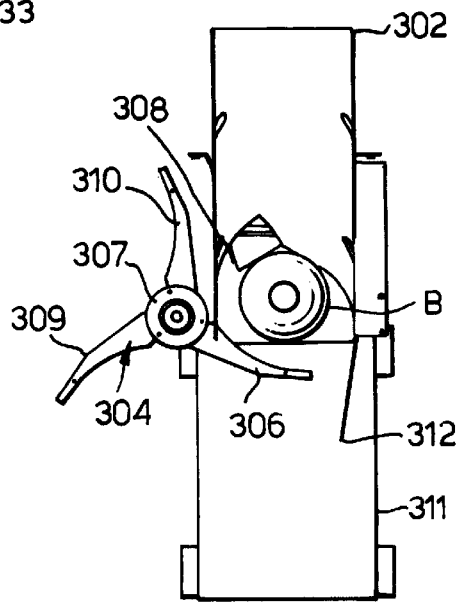
Figure 14:
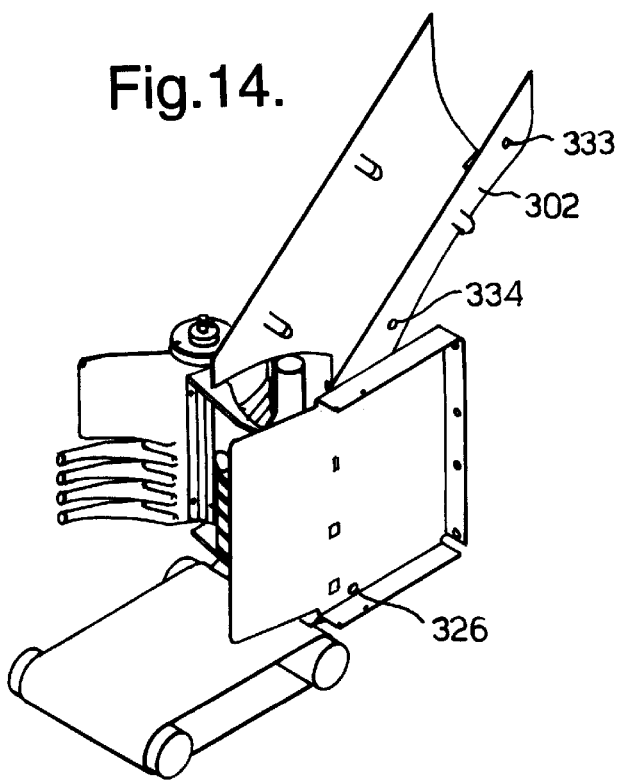
Figure 15:
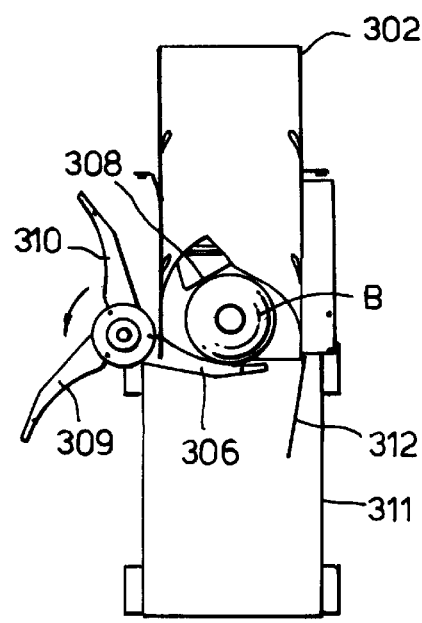
Figure 16:
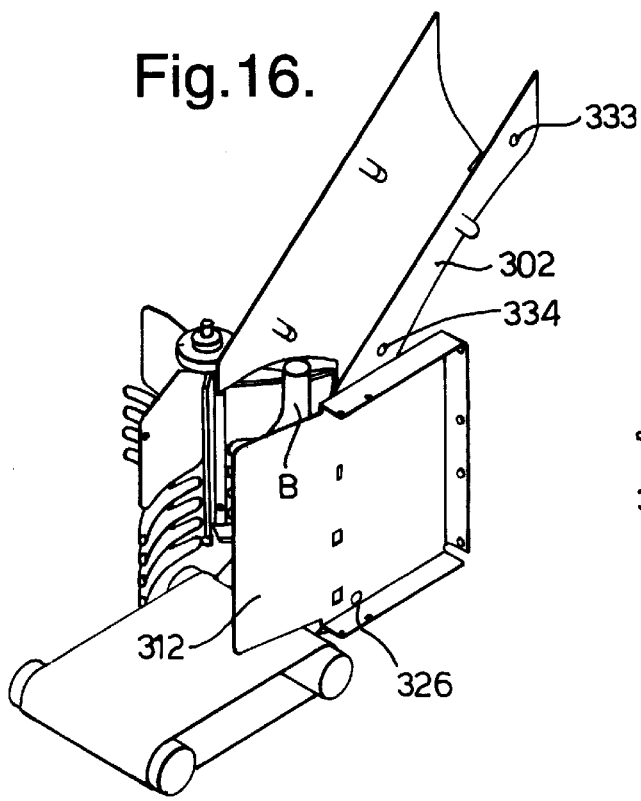
Figure 17:
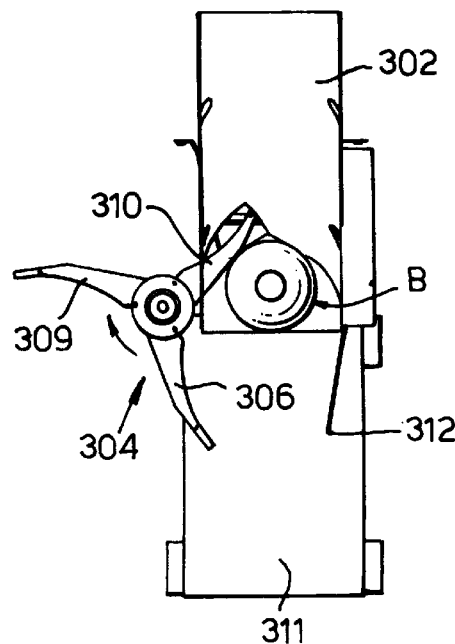
Figure 18:
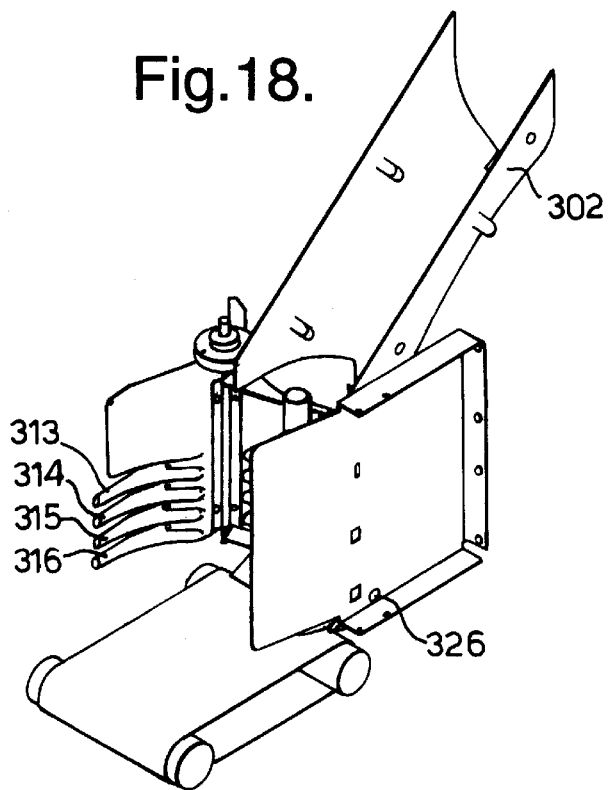
Figure 19:
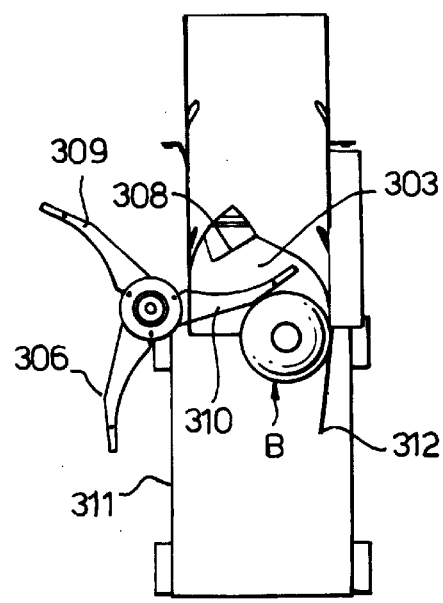
Figure 20:
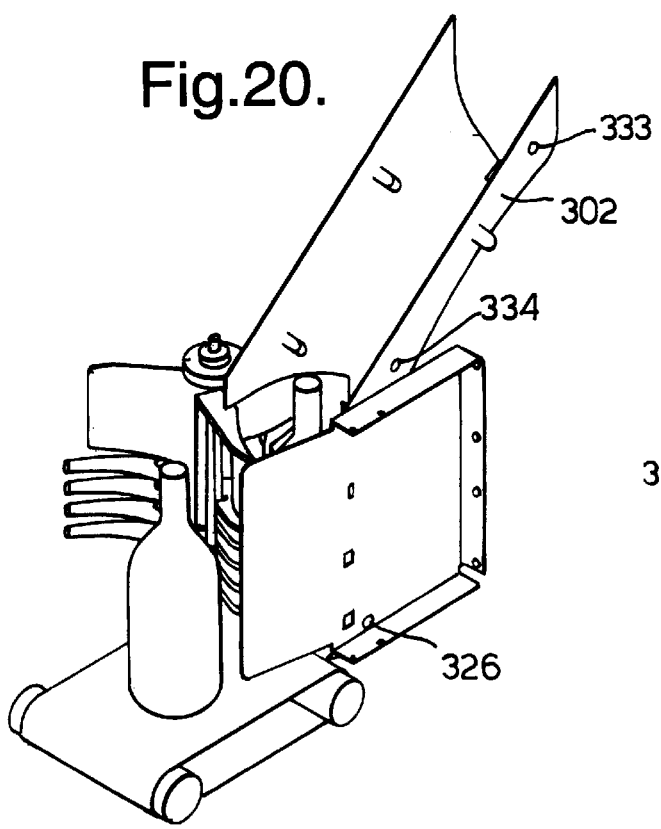
Figure 21:
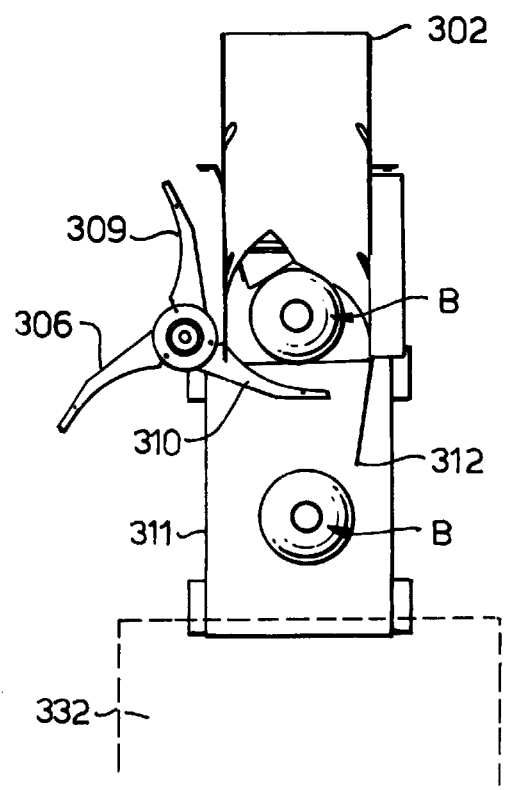
Figure 23:
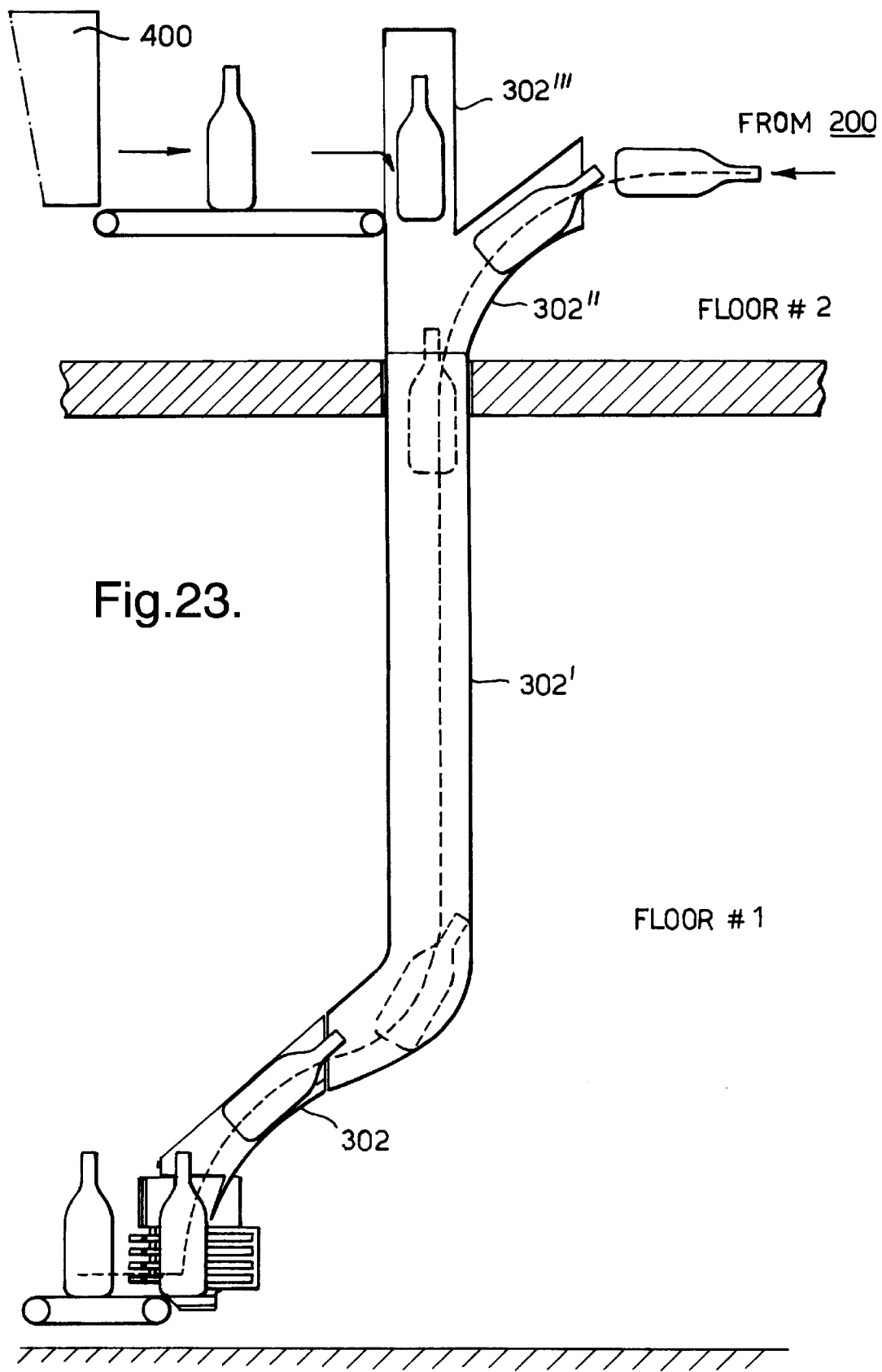
FIG. 23 shows a variant of the bottle raiser in FIGS. 10–21.

At the downstream end of the conveyor 201, there is provided according to the invention, a bottle raiser 301, with a view to conducting transported bottles B which arrive bottom B2 first from a lying position, as indicated to the right in FIGS. 10 and 11, to a vertical or standing position as shown clearly in FIG. 11. The bottle raiser comprises a curved guide duct or shaft 302 which provides a guide or slide for the bottle B and a shock absorbing rest 303. The guide duct 302 may be of different lengths and may be constructed to guide bottles across of distance of some meters, e.g., from one floor to a floor below, as indicated in FIG. 23. For this purpose the guide duct may have, e.g., an upright portion 302'. Uppermost the guide duct 302' may run into a curved portion 302" for transferring the bottles in lying position to the guide duct 302'. Alternatively, as indicated by means of the reference numeral 302''', the bottle raiser may also conceivably be used for bottles which are discharged from a reverse vending apparatus 400 in standing position. The bottle will thus arrive in standing position with it bottom against the rest 303. Optionally, the rest 303 may be positioned horizontally. A bottle stabiliser indicated by means of the reference numeral 304 is operated by a stepping motor 305 (for the sake of simplicity only shown in FIG. 12). The bottle stabiliser 304 is a rotatable unit having at least one vertical wing 306 which is secured to a vertical spindle 307. In a first position of the bottle stabiliser, the wing shown in FIG. 13 will be in contact freedom with the bottle B as a function of data calculated by the motherboard 124 of the detector section relating to the bottle, e.g., diameter, height and weight, whereby the bottle B is capable of being guided freely down towards the rest 303. Then the-wing 306, on control from the motherboard and thus via the motor control card 126, will be brought into a second position as shown in FIG. 15 in contact against a portion of the bottle and push the bottle B towards a back wall 308 in said duct or shaft 302. The bottle stabiliser 304 is made so that it also functions as a bottle ejector. For this purpose the bottle stabiliser can, for example, be equipped with additional wings, e.g., wings 309 and 310, the motor 305 on stabilisation as shown in FIGS. 14 and 15 turning, when seen from above, anti-clockwise, whilst the unit 304, as shown in FIG. 17, turns clockwise thereby causing the wing 310 to push the bottle B onto a further conveyor 311, preferably with the aid of a guide wall 312.

In a preferred embodiment, the combined bottle stabiliser and bottle ejector 304 is preferably equipped with three vertical wings. However, it will be understood that it is fully possible to use a smaller number of wings or perhaps a larger number of wings if the bottle dimensions are small or the spindle 307 is some distance from the side of the guide duct or shaft 302.

Figure 12:
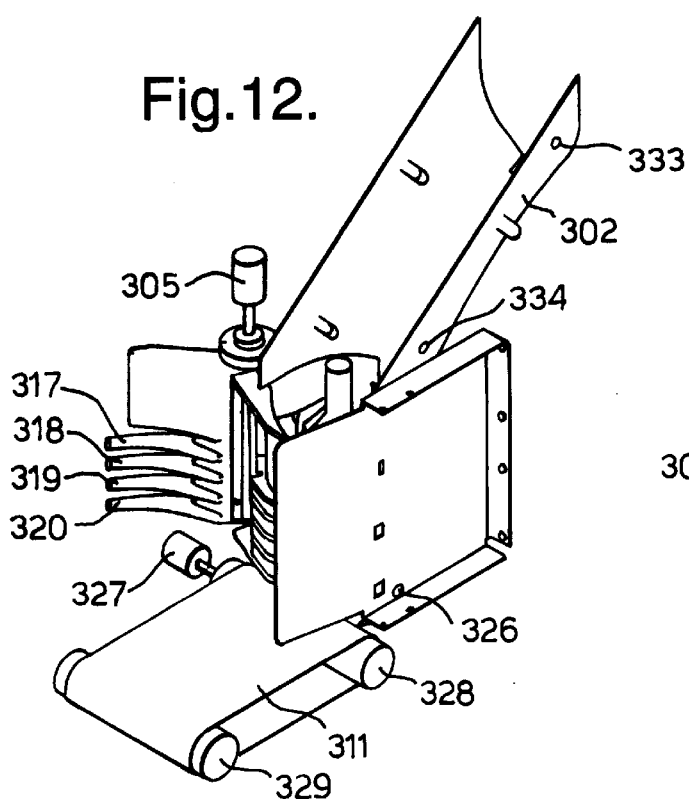

As can be seen clearly from FIGS. 10–12, 14, 16, 18 and 20, at least the lower portion of the wings 306, 309 and 310 are made having a plurality of fingers, such as the fingers 313, 314, 315, 316, for the wing 306 and the fingers 317, 318, 319 and 320 for the wing 309, as shown in FIG. 12. The fingers on the wing 310 are poorly visible in FIG. 20, but will have a design corresponding to those on the wings 306 and 309.

As can be seen from FIG. 11 in particular, the back wall 308 is also made having fingers 321, 322, 323, 324 and 325, so that the finger portions on the wings 306, 309 and 310 can pass between the mutual space between the fingers 321–325 of the back wall. As can be seen from FIGS. 12–21, the respective wings 306, 309 and 310 in the rotating unit which constitutes both the bottle stabiliser and the bottle ejector are slightly curved. This curve is desirable in order to ensure a controlled stabilisation and ejection. The wings 306, 309 and 310 have preferably the same angular separation.

Figure 22:
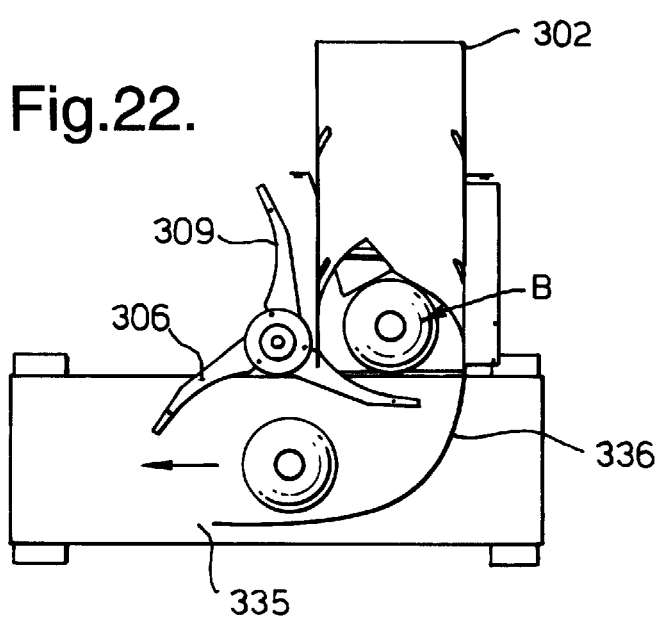
FIG. 22 shows a variant of the discharge solution from the bottle raiser.

Once the wing 310 has ejected a bottle B, a new bottle B comes into place on the horizontal rest 303 and is ready for stabilisation with the aid of the wing 310 which has just ejected the bottle. Thus, according to a preferred embodiment of the invention, it will always be the wing which has ejected the previous bottle which will have a stabilising effect on the next bottle. Thus, an efficient operation is achieved by the combined bottle stabiliser and bottle ejector 304. In order to register that a bottle comes into place on the rest 303, there may be provided at a lower portion of the guide, an arrival sensor 326 which views the space at the bottom of the guide or shaft 302. It is also possible to provide bottle position sensors, e.g., 333 and 334, along a higher portion of the guide or shaft 302. The conveyor 311 is driven by a motor 327, which for the sake of simplicity is indicated on only FIG. 12. The conveyor 311 will, with the aid of the motor 327, cause the ejected bottles to be transported further. The conveyor 311 may either convey the bottles in the same direction as they were conveyed through the sections 100 and 200, or provide transport in a transverse direction with the aid of a transversely positioned conveyor 335, as shown in FIG. 22. In this case the guide wall 326 should be extended and made having a curve as is shown by means of the reference numeral 336.

The motor 327 may either be a motor designed for continuous operation or a typical stepping motor. The conveyor 311 is operated in a known way per se over respective end rollers 328 and 329. As for the position sensor 326 in connection with the bottle raiser 301, it may also be expedient to provide the bracket 218 with a position sensor 225 which views an indicator 226 which is fixedly mounted on the tiltable holder 216. In this way a centre position for the holder 216 can always be accurately registered. Furthermore, it is possible to provide a position sensor 227 on the actual frame of the conveyor 201 close to the position of the holder 216, so that when the sensor 227 registers that a container bottom has reached the position of the sensor 227 and is to be thrown out to one side or the other as shown in FIGS. 7 and 8, respectively, the motor 206 is made to stop, whilst the motor 219 operates to tilt the holder 216 to one side or the other as shown in FIGS. 7 and 8.

From the motherboard 124 as shown in FIG. 2 there is a possibility of control to and from a check-out unit in a shop or supermarket, as indicated by the line 157. 230 V AC is supplied to a power supply 158 which gives out +24 V DC to inter alia the motherboard. In connection with the power supply there is provided a network distributor card 159 which is connected to a 12-channel serial bus 160 which communicates with the motherboard 124, and where the bus is also connected to an in/out channel card 161 which on detection of, e.g., a stoppage in the discharge from the conveyor 311, as a result of a stoppage signal from a detector 330, emits a external alarm 331. The stoppage may be attributable to the fact that a collection table 332, which follows immediately after the conveyor 311, has become full.

Figure 24:
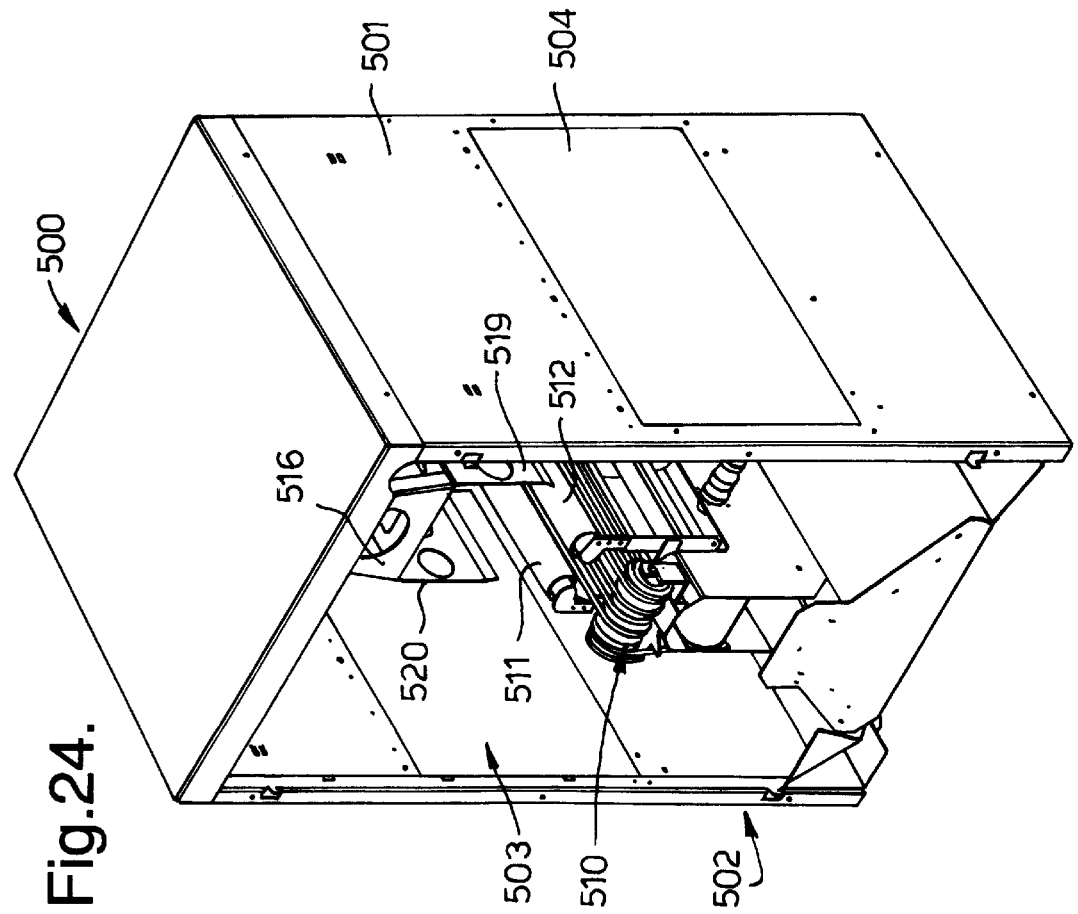
FIG. 24 is a perspective view of an alternative sorting device for use, preferably in connection with the reverse vending apparatus shown in FIG. 1.

A sorting device is shown in FIG. 24 which may either be an independent unit or serve as a supplement to the reverse vending apparatus described in connection with FIGS. 1–23 or as a replacement for the sorting device 200 as shown and described in connection with FIGS. 1, 2, 5*a*, 5*b*, 6, 7, 8 and 9.

The sorting device, which can only be seen in part in FIG. 24, is mounted preferably inside a cabinet 501 and may have in a longitudinal direction a discharge opening 502 and an insertion opening (which cannot be seen clearly in FIG. 24). Furthermore, the sorting device may have removeable panels 503 and 504 on the longitudinal sides of the cabinet for transverse sorting out from the conveyor which forms a part of the device.

For a closer understanding of the device in its entirety, reference will now also be made to FIGS. 25–33.

Figure 25:
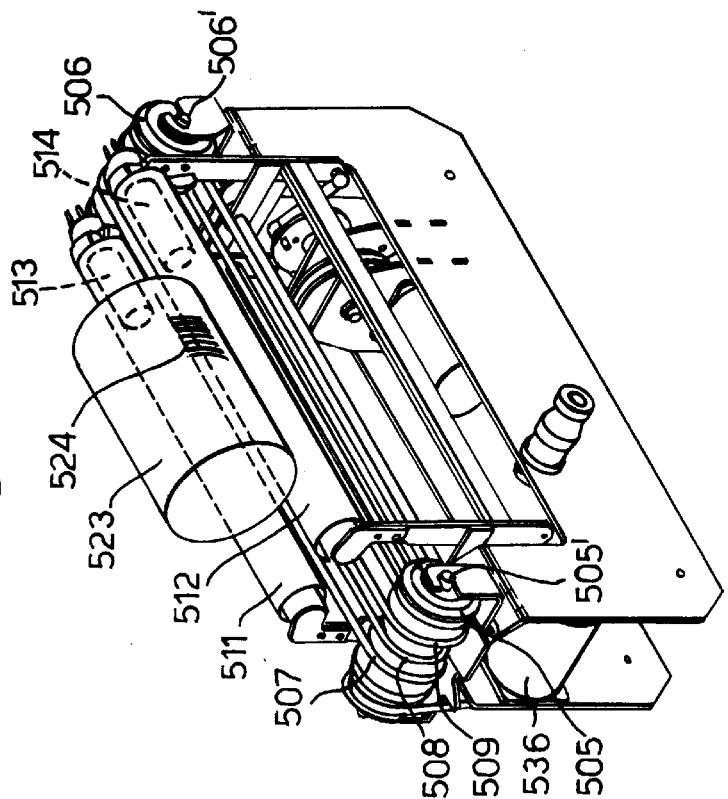
FIG. 25 shows in perspective the conveyor and container lifting and rotation part of the device in FIG. 24.
Figure 29:
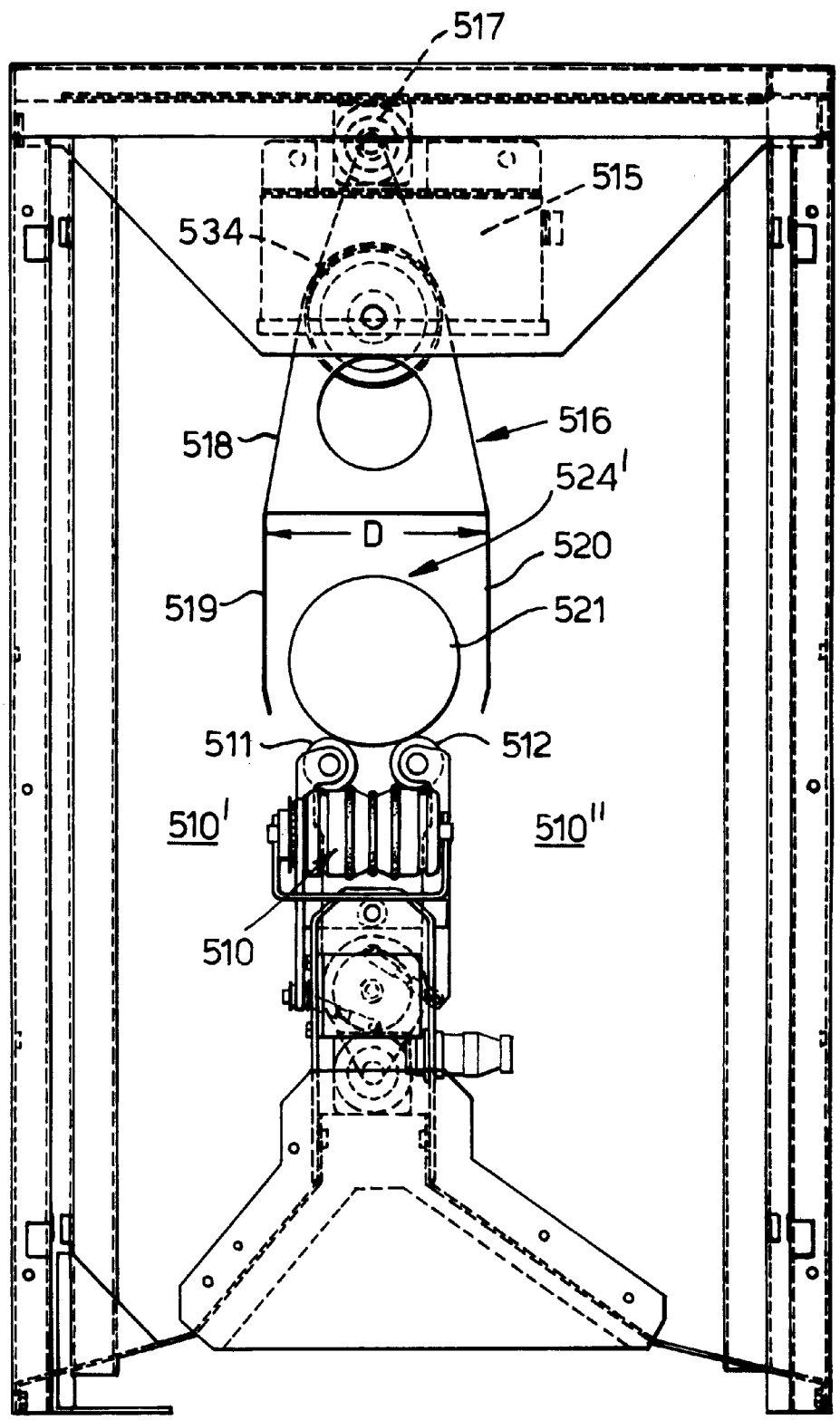
FIG. 29 is an end view of the device in FIG. 24 in a container lifting and rotation position.
Figure 30:
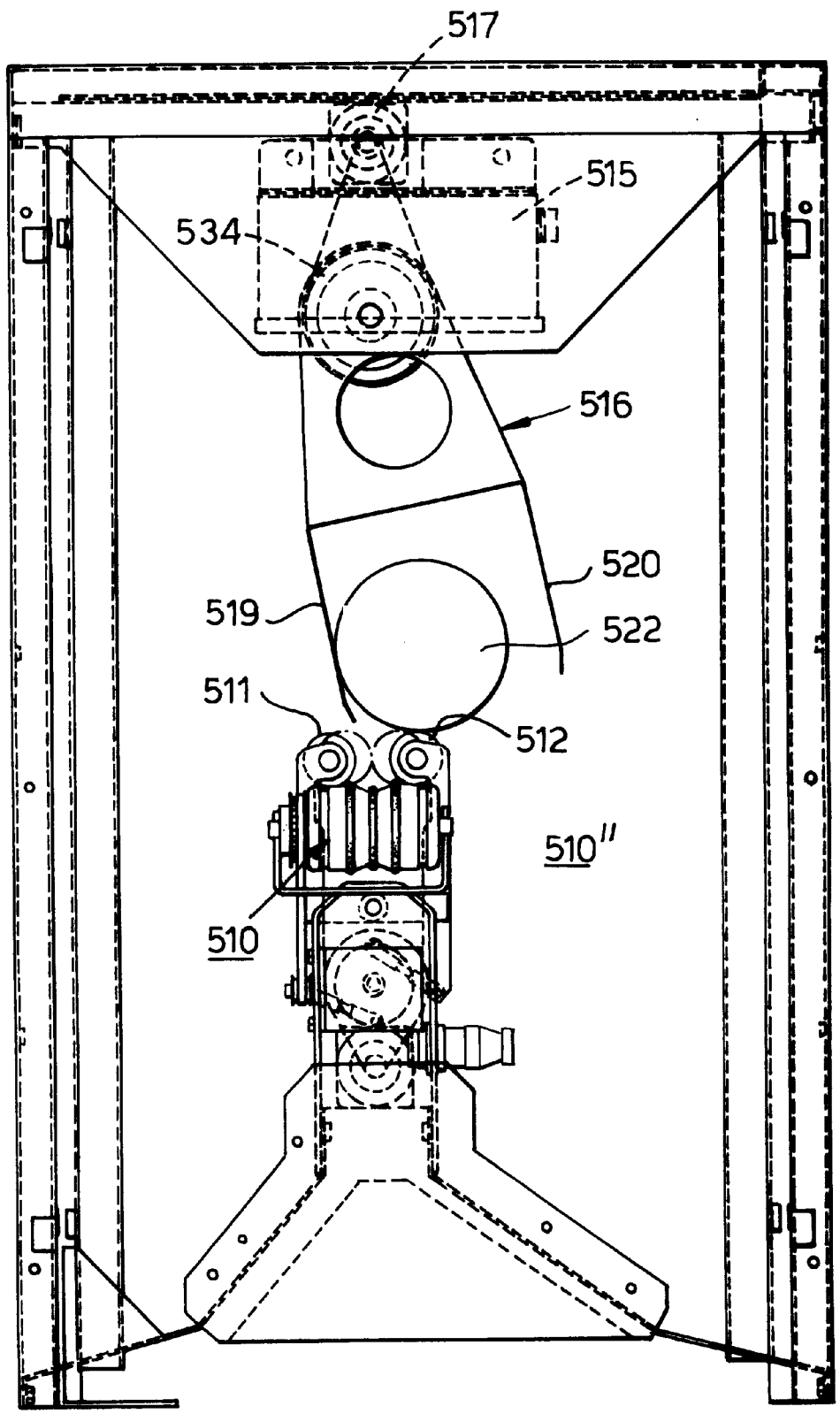
FIG. 30 is an end view of the device in FIG. 24 in a first container ejection position.
Figure 31:
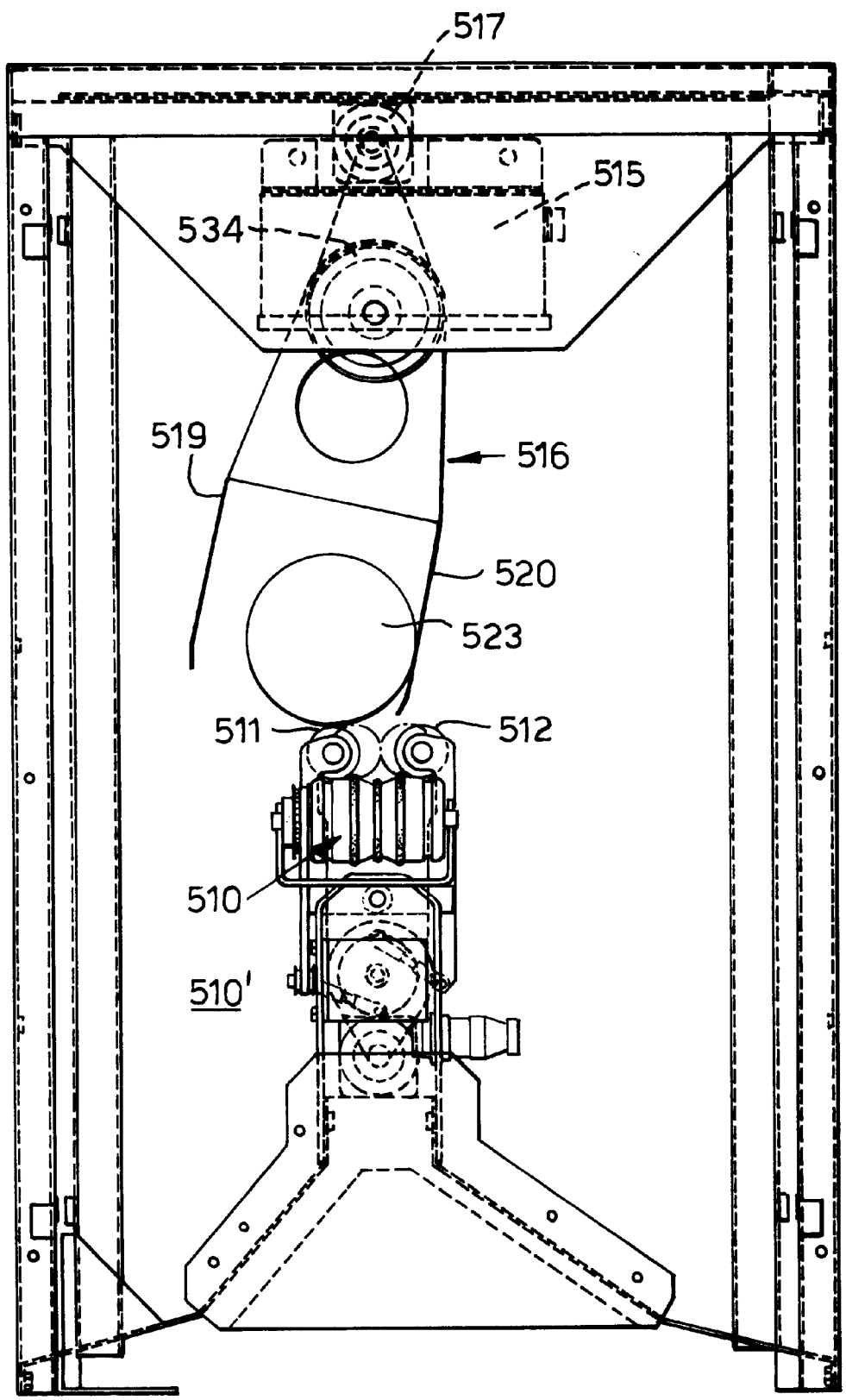
FIG. 31 is an end view of the device in FIG. 24 in a second container ejection position.
Figure 32:
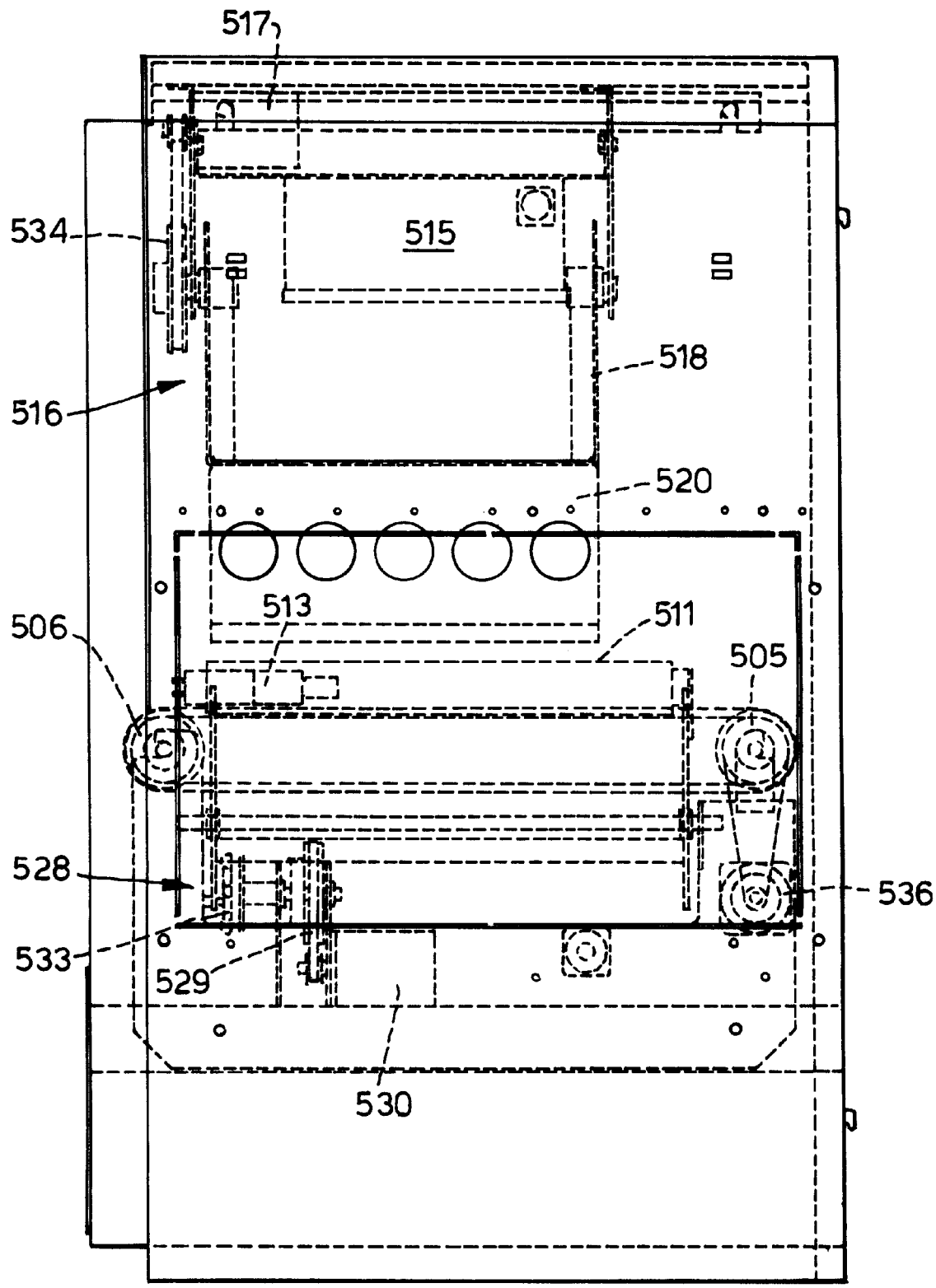
FIG. 32 is a side view of the device in FIG. 25.

FIG. 25 shows a lower part of the sorting device according to FIG. 24. A conveyor is shown which has a first rotatory roller unit 505 and a second rotatory roller unit 506. A first driving motor 536 is connected to the first of the roller units 505 in order to cause rotation thereof about its axis of rotation 505' and thereby rotation of the second roller unit 506 about its axis of rotation 506' by moving a plurality of adjacently disposed, continuous elastic belts or bands 507, 508, 509 which run in respective grooves on the roller units 505 and 506. A first roll 511 and a second roll 512 are provided along a first longitudinal side 510' and a second longitudinal side 510" of the conveyor 510 (see inter alia FIG. 29). The rolls 511 and 512 can be made to rotate about their longitudinal axis in the same direction of rotation. The rotation is effected preferably with the aid of first and second roll driving motors 513 and 514, respectively. The motors 513 and 514 are preferably mounted internally in a cavity 511', 512' in respective rolls 511 and 512. The rolls 511 and 512 are by coordinated movement moveable in a horizontal direction and optionally a vertical direction in relation to the conveyor 510, as is shown in more detail in FIGS. 26, 27 and 28. The rolls 511 and 512 are indicated in their outer position by means of the broken lines in FIG. 28 where they lie substantially laterally outward in relation to the container transport path of the conveyor 510, so that the containers can be transported by the conveyor 510 without coming into contact with the rolls 511 and 512. In a second position, the rolls 511 and 512 are above the conveyor and displaced towards each other so as to be spaced apart at a distance d which is smaller than the width of the conveyor 510. In this second position, which is an intermediate position, the rolls 511 and 512 are brought towards the container and clamp against it, whereby the container is lifted up from the conveyor 510 and can be rotated about its longitudinal axis when the rolls 511, 512 are made to rotate. In FIG. 27 a third position of the rolls 511, 512 is indicated in broken lines, which is designated as a container ejection position of the rolls, where the distance d has been reduced to a minimum, whereby the container will be lying in an unstable manner, and will be easy to tip to the side with the aid of a sideways displacer 516, as shown in FIGS. 30 and 31. However, it will be understood that the distance d is adjustable depending upon the cross-sectional dimension of the container. Even though the third distance at which the rolls are spaced apart will normally be a minimum, it is conceivable that in some cases at least it will be equal to d. Normally it will be smaller than d.

A detector 515 in the form of a bar code reader is located above the conveyor. Furthermore, said sideways displacer 516, which is driven by motor 517, is located at a distance above the conveyor 510, in order to optionally remove containers sideways from the conveyor 510 with a sideways movement when actuated by the motor 517. The sideways displacer 516 consists of a laterally displaceable suspension 518 which is, in the preferred embodiment, capable of being swung to one side or the other, as can be seen in FIGS. 30 and 31. The suspension 518 has secured thereto a substantially downward directed pair of plates 519, 520 where the plates are spaced apart at a distance D which is at least equal to the width of the conveyor 510. When a container, e.g., a can or bottle, is introduced onto the conveyor 510 it is of interest to have a reading taken of the characteristic bar code that has been applied to the container. Often it is pure chance whether the bar code faces upwards so that it can be read by the bar code reader 515. For this reason it is necessary in the sorting device to ensure that the container is rotated, like the container 521 shown in FIG. 29, or a container 522 shown in FIG. 30, or a container 523 as shown in FIG. 31. In FIG. 25 a container 523 is shown having a bar code field 524 which is turned so far away from the bar code reader 515 that an unambiguous bar code reading is virtually impossible. It is therefore necessary to ensure that the container 521, 522, 523 is rotated so that its bar code field, here for the sake of simplicity only indicated by means of the reference numeral 524 for all the containers, is in an area which can easily be read by the bar code reader 515, as for example indicated by the marking 524' on FIG. 29. When a container 521, 522, 523 is introduced onto the conveyor 510, the rolls 511 and 512 will be in a laterally outward displaced position, as is shown with the broken lines in FIG. 32. The rolls 511 and 512 have respective arms 525 and 526 which are pivotally mounted about the common centre of rotation 527 on the sorting device. The arms are actuated by means of an arm rotation mechanism 528 which via a transmission 529 is driven by a motor 530. The lower ends 525' and 526' of the arms 525 and 526 are pivotally connected to a respective link 531 and 532. The links 531 and 532 are at their other end pivotally connected to radially opposite portions of a revolving disc 533 which is operated by said motor 530 via the connection 529. When the revolving disc 533 is moved in the direction of the arrow A, the lower ends 525' and 526' of the arms 525 and 526 will be moved towards each other at the same time as the arms turn about a common centre of rotation 527, whereby the rolls 511 and 512 which are pivotally mounted on the respective upper ends 525" and 526" of the arms 525 and 526 move apart and assume a position as indicated in broken lines on FIG. 28, i.e., that the space between the rolls 511 and 512 does not essentially need to exceed the width of the conveyor 510. What is essential is that each size of container, such as a can or bottle, is to be capable of being carried in on the conveyor 510 without first coming into contact with the rolls 511 and 512, and where there is also a possibility that the conveyor 510 can convey the container further in the axial direction of the conveyor without coming into conflict with the rolls 511 and 512 when these are displaced laterally outward.

When a container, such as a container 521, 522 or 523, is introduced onto the conveyor 510 and comes to a standstill there, the rolls 511 and 512 will be made to move towards each other and thereby come to rest against the can or bottle at a lower portion thereof seen in horizontal cross-section. This emerges particularly clearly from that which is shown in FIGS. 25 and 29. By using the motor controlled arm rotation mechanism 528, the container 521, 522 or 523 will be lifted up from engagement with the conveyor's belts or bands 507, 508, 509, and on rotation of the rolls 511, 512 the container will be made to rotate about its longitudinal axis, so that the bar code 524 on the container can be read.

It will be within the skills of a person versed in the art to choose the most appropriate driving motors for respectively the roller units 505, 506, the rolls 511, 512 and the sideways displacer 516. It would be advantageous if at least one of these driving motors 507, 513, 514, 530 and 517 was a stepping motor.

On the detection of the bar code on the container 521, as is shown in FIG. 29, it is conceivable that it will be established, as will be described in more detail, that the container 521 is not to be discharged sideways relative to the conveyor 510, but on the contrary is to be carried further on the conveyor 510 onto a subsequent conveyor. After this has been established, the arms 525 and 526 will move outward and thus also with the rolls 511 and 512 spaced apart at greatest possible distance, whereby the container 521 can freely-move onwards with the aid of the conveyor 510. In the case as shown in FIG. 30, the container 522 has been found to be of such a type that it must be sorted for removal from the conveyor 510 by lateral discharge to one of the sides 510" of the conveyor 510. By operating the motor 517, a revolving disc 534 on the suspension 516 will cause the suspension and pusher plates 519 and 520 to be pivoted toward the side 510", thereby pushing the container 522 away from the conveyor 510 with the aid of the plate 519. The rolls 511 and 512 will then to advantage be pushed towards each other as far as possible as shown in broken lines in FIGS. 27 and 30.

In FIG. 31 it is shown how a second container 523, after the bar code has been read on the container through correct positioning of the bar code 524 in relation to the bar code reader 515, is tipped towards the other side of the conveyor 510, here indicated by means of the reference numeral 510', in that the suspension 516 with its plates 519, 520, moves in the opposite direction to that shown in FIG. 27, whereby the plate 520 in the plate pair 519, 520 causes the container 523 to be pushed sideways off the conveyor 510. The rolls 511 and 512 will also in this case be as close to one another as possible, as is shown in broken lines in FIGS. 27 and 31.

Figure 33:
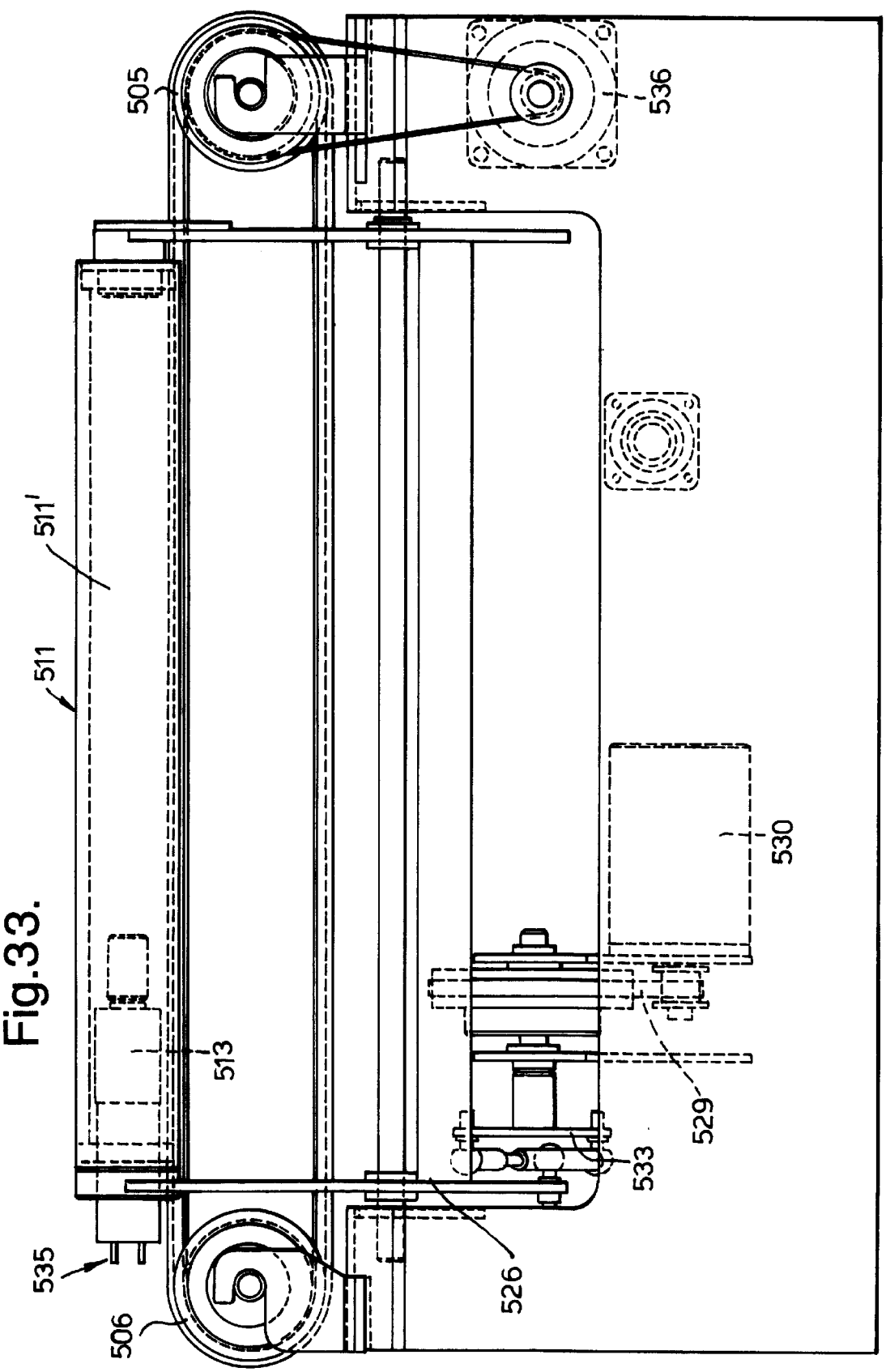
FIG. 33 is a side view of the part of the device shown in FIG. 25.

The motors 513, 514 which drive the rolls 511, 512 have a power supply at an end portion thereof, as is indicated by means of the reference numeral 535 on FIG. 33.

Figure 26:
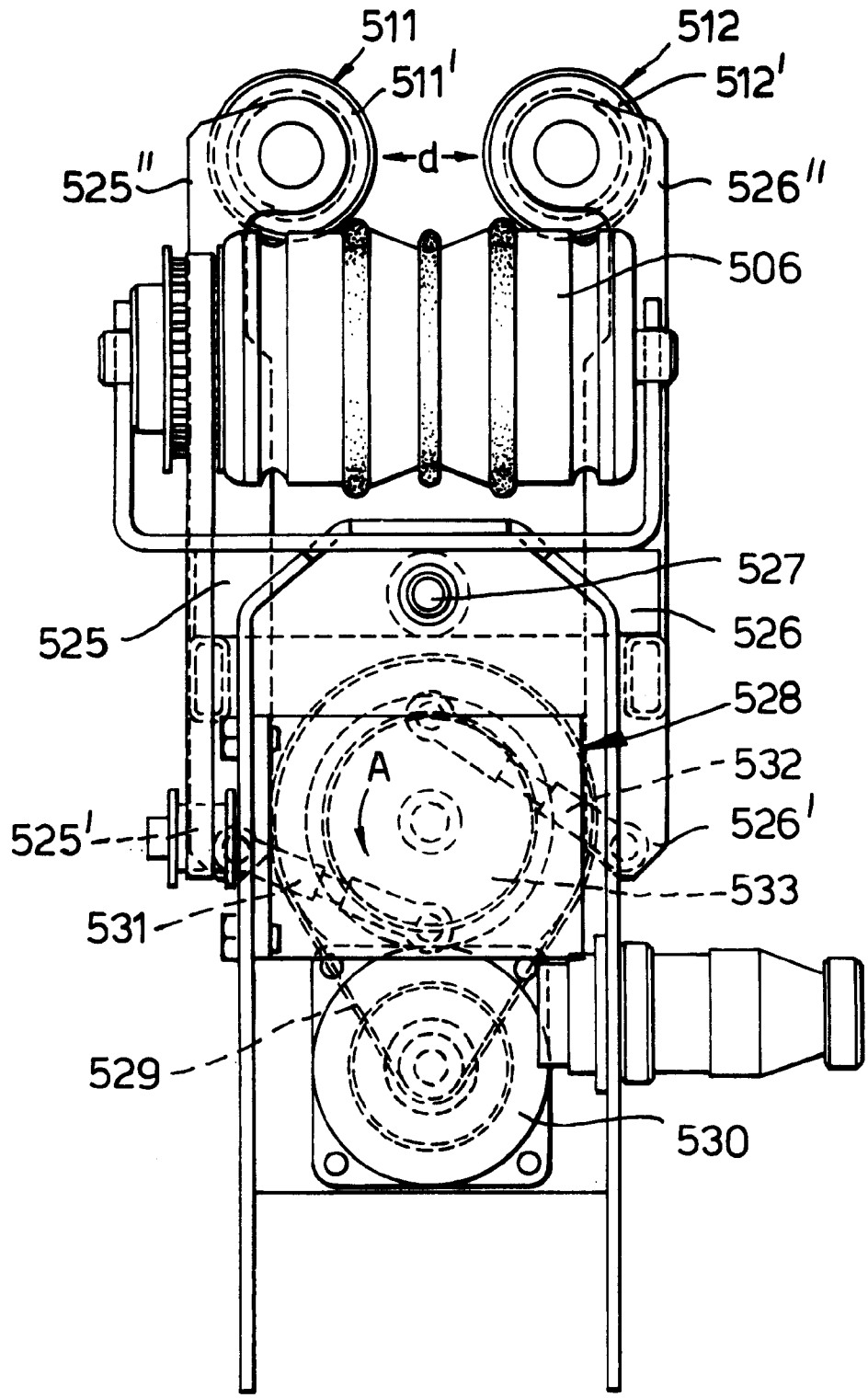
FIG. 26 is an end view of the device in FIG. 25 in a container lifting and rotation position.
Figure 28:
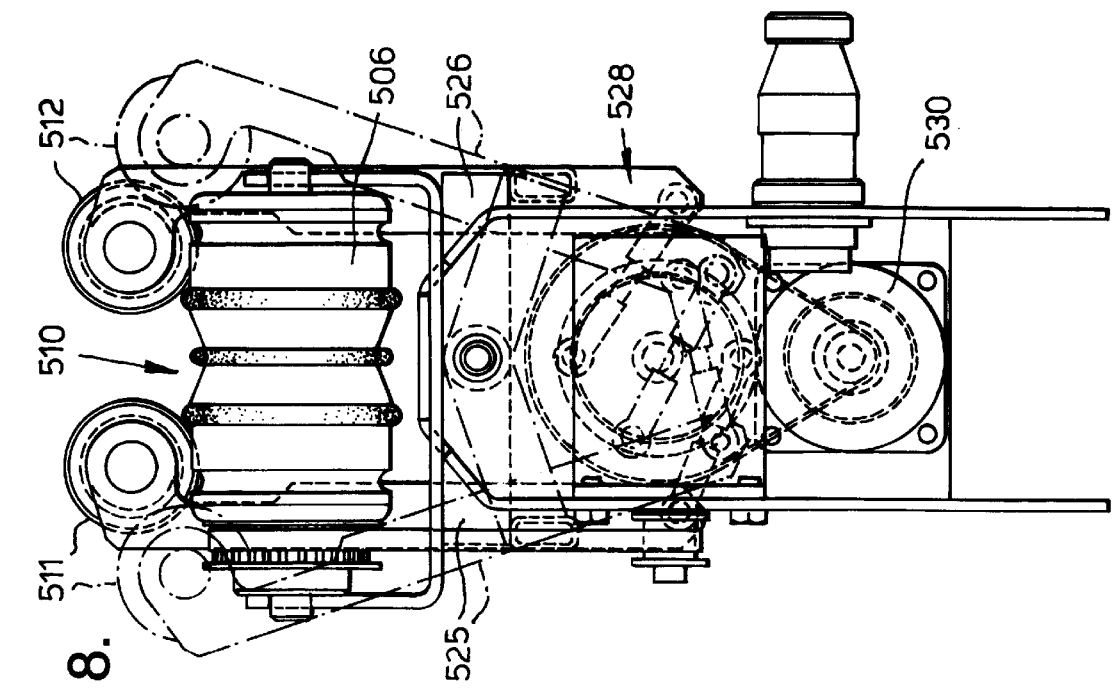
FIG. 28 is an end view of the device in FIG. 25 and with a container further transport position indicated in broken lines.
Figure 27:
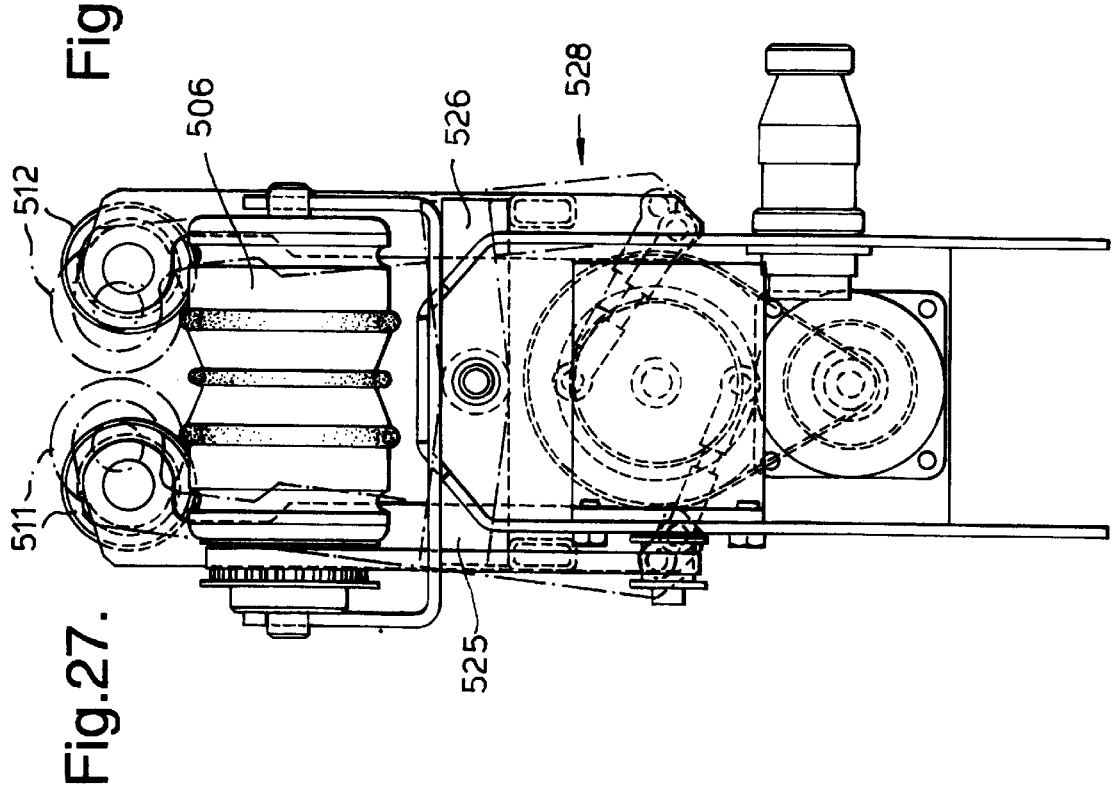
FIG. 27 is an end view of the device in FIG. 25 and with a container ejection position indicated in broken lines.

As shown in particular in FIGS. 26, 27 and 28, each roller unit 505 and 506 may preferably be made having a double-cone configuration or so-called diabolo shape.

Although the belts or bands 507, 508, 509 are shown having an approximately circular cross-section, these might conceivably have a rectangular, triangular or polygonal cross-section.

If a container which is fed onto the conveyor 510 has a cross-section other than approximately circular, it might conceivably be difficult to turn the container. This may be seen as especially problematic if the container for example has a polygonal cross-section. However, there is a possibility in such a case of moving the rolls 511 and 512 a little further apart or closer together in order to obtain better torque on the container. A modification of this kind in the mode of operation lies within what must be expected of the efforts of a person versed in the art in order to solve this problem. Similarly, the distance d at which the rolls are spaced apart may be varied, depending upon the container type, and the distance d shown in FIG. 26 must in no way be perceived to be limiting. The rolls may also conceivably rotate in the position (see FIG. 27) wherein they lie close to one another.

Figure 34:
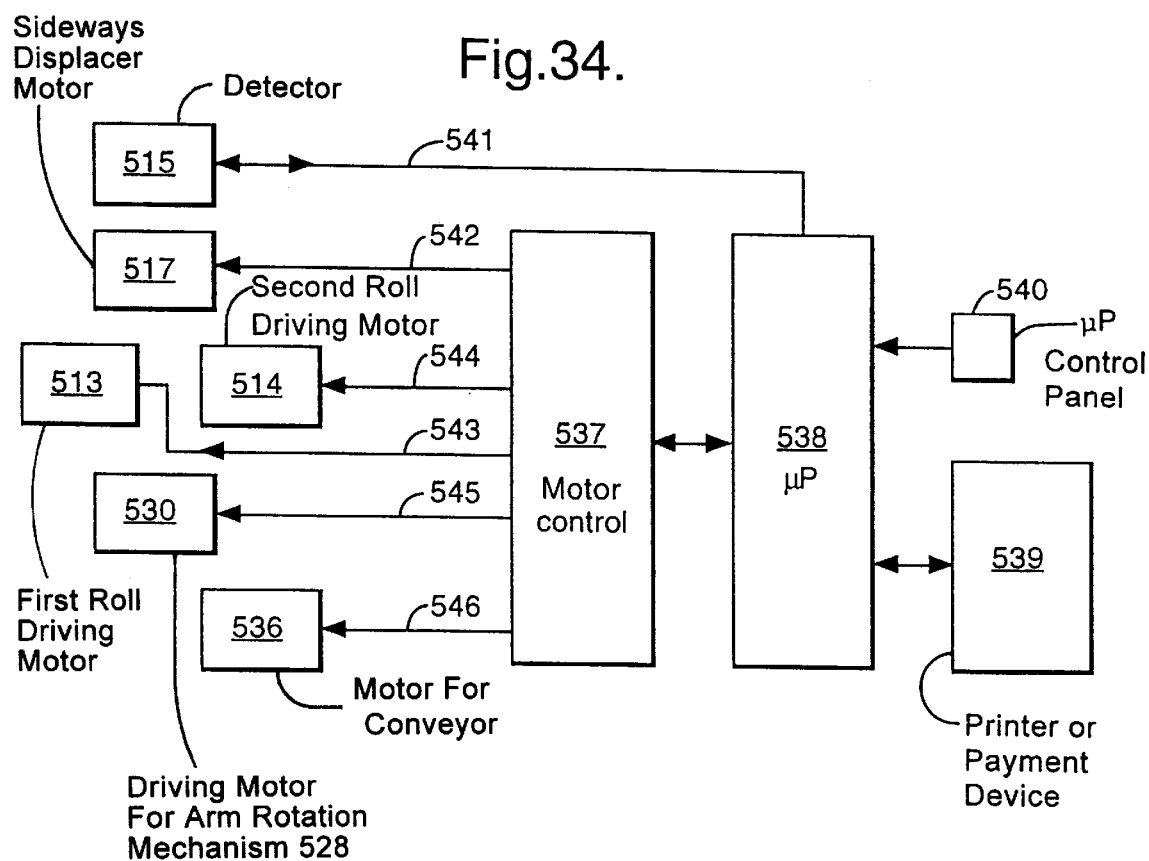
FIG. 34 is a simplified block diagram of the electrically connected parts in the device according to FIGS. 24–33.

The device 500 will now be described with reference to the block diagram in FIG. 34.

There is shown provided a motor control unit 537 which is intended for the control of the motors 517, 513, 514, 530 and 536 via respective control cables 542, 543, 544, 545 and 546. A microprocessor 538 communicates with the motor control 537 via a connection 548. The microprocessor 538 communicates with the bar code reader 515 via a cable 541. If the sorting device according to the present invention is designed to operate alone and base sorting only on detection by means of the bar code reader 515, the block diagram in FIG. 34 will be guiding for the electrical structure of the device. The microprocessor 538 can be controlled by a user with the aid of a control panel 540, which, for example, may contain an actuating switch. The microprocessor 538 will be preloaded with characteristic bar code data in order to effect the correct sorting out of the inserted containers. The said bar code data will also be indicative of the deposit value, if any, that an inserted container has and, by operating the control panel 540, a print-out or payment of accumulated deposits for inserted containers could be effected via the unit 539.

Figure 36:
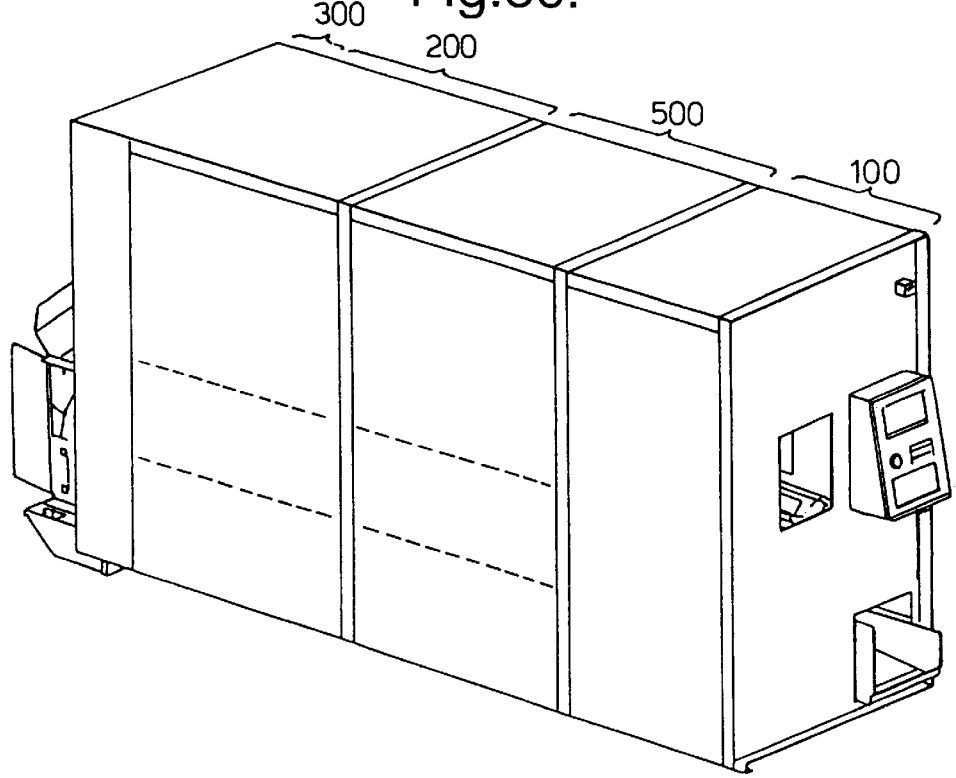
FIG. 36 is a schematic illustration of the device according to FIGS. 24–35 incorporated into the reverse vending apparatus.

However, it is conceivable that the sorting device according to FIGS. 24–33 where also rotation of a container takes place prior to sorting out, could be connected to a reverse vending apparatus as described in connection with FIGS. 1–23. In FIG. 36 it is shown in more detail how the device 500 could appropriately be placed downstream relative to the device 100 and that the device 200 is placed downstream relative to the device 500, and further than the device 300 is placed downstream relative to the device 200. It is also possible within the scope of the invention to envisage that the sorting device 200 may optionally be dispensed with, so that the reverse vending apparatus as shown in FIG. 36 in reality is reduced to a combination of the sequence of the devices 100, 500 and 300. In connection with such a possible removal of the device 200, the connections thereto must of course be removed or put out of operation.

Figure 35:
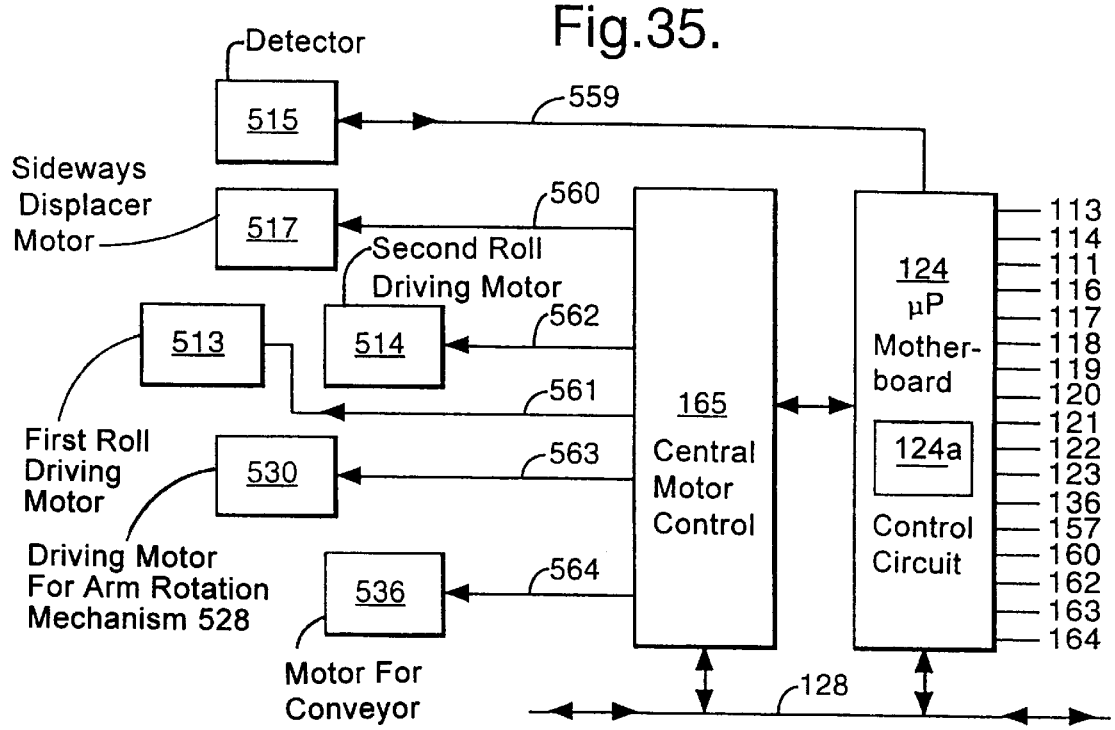
FIG. 35 shows the device according to FIGS. 24–33 linked to the electrical functional parts of a reverse vending apparatus as shown and described in connection with FIG. 2.

The block diagram in FIG. 35 has reference to that which is shown and described in connection to FIG. 2. Only additional parts linked to FIG. 2 have been included in FIG. 35, as it will immediately be understood that the other elements which are shown and described in connection with FIG. 2 must be considered in conjunction with that shown and described in connection with FIG. 35.

In this connection, it will be expedient to provide, instead of the motor control unit 537, a central motor control 165 inside the device or the unit 100. By making a suitable modification or replacement of another type, the microprocessor 124 with associated unit 124a as previously shown and described, will be able to receive bar code readings from the bar code reader 515 via the connection 559. The bar code reader will also receive signals from the microprocessor 124. The motor control 165 will via the expansion bus 128 receive control signals from the microprocessor 124 for selective control of the motor 513, 514, 517, 530 and 536 via respective connections 561, 562, 560, 563 and 564.

As soon as the bar code reader 515 has registered a bar code and this has been determined by the microprocessor 538 or the microprocessor 124, said microprocessor will, via respective motor control 537 or 165, be able to cause the rolls 511 and 512 to move apart in that the motor 530 is operated, so that the container which thus falls down onto the conveyor 510 will be carried further by operating the motor 536. If the container is to be tipped to one side or the other relative to the conveyor 510, the motor 517 must be operated to be turned in one direction or the other, as shown and described in connection with FIGS. 30 and 31.

When the device according to FIGS. 24–33 is included in a container transport path and data concerning the shape and/or colour and/or material type of the containers has been previously registered by the reverse vending apparatus upstream in the transport path in relation to the device's conveyor 510, such data will together with the bar code data obtained from the bar code reader 515 be fed either to the processor 124, where the processor 124 processes these data in order to determine whether the container is to be fed on towards the downstream end of the conveyor for further transport from there by means of a subsequent conveyor or laterally displaced away from the conveyor, as shown and described, and also whether the container is linked to a refundable deposit, optionally is recyclable, is to be compacted or in another manner further treated or further conveyed.

Within the scope of the invention, as defined in the claims below, modifications of the individual embodiments will of course be possible without thereby departing from the inventive idea.

I claim:

1. A device for handling containers, e.g., cans made of glass, plastic, wood or metal or bottles of glass or plastic, wherein the containers with the aid of a conveyor are conveyed in lying position past a detector in order to inspect characteristic data about the containers, and means which, on the basis of such data, determines how the containers are to be handled subsequently, e.g., sorted for removal from the conveyor, or conveyed further to the downstream end of the conveyor, and wherein the conveyor has first and second rotatory roller units, a first driving motor being connected to a first of the roller units to cause rotation thereof about its axis of rotation and thereby rotation of the second roller unit about its axis of rotation, by movement of belts or bands which extend continuously about and between the roller units, characterised in that a plurality of adjacently disposed, continuous elastic belts or bands run in grooves on the roller units;

that along a first and a second longitudinal side of the conveyor there are provided respectively a first and a second rotatable roll, wherein the rolls can be made to rotate with the aid of respective first and second roll driving motors about their longitudinal axis in the same direction of rotation, and where the rolls on coordinated movement are moveable in the horizontal direction relative to the conveyor, whereby the rolls are displaceable to a first position wherein they lie substantially laterally outward relative to the container transport path of the conveyor and are spaced apart at first distance, a second position wherein they are located above the conveyor and displaced towards each other so as to be spaced apart at a second distance which is smaller than the width of the conveyor, and a third position wherein the rolls are spaced apart at a third distance which is smaller than or equal to said second distance;

that the detector is a bar code reader located at a distance above the conveyor; and that that at a distance above the conveyor there is also provided a motor-driven sideways displacer for the containers, wherein the displacer consists of a laterally displaceable suspension on which is secured a substantially downward directed pair of plates, wherein the plates are spaced apart at a distance at least equal to the width of the conveyor.

2. A device as disclosed in claim 1, characterised in that the rolls are mounted on a pair of arms which, when the rolls above the conveyor are positioned so as to be spaced apart at said second distance with the aid of a motor-driven arm rotation mechanism, lift the container up from the conveyor and, on rotation of the rolls, cause the container to rotate about its longitudinal axis, so that a bar code located on the container can be read by the bar code reader.

3. A device as disclosed in claim 1, characterised in that each of the roller units is made having a double-cone configuration, a so-called "diabolo" shape.

4. A device as disclosed in claim 1, characterised in that the rolls are driven by respective internally mounted motors.

5. A device as disclosed in claim 1, characterised in that at least one of the driving motor for the roller units, rolls and sideways displacer is a stepping motor.

6. A device as disclosed in claim 1, characterised in that said belts or bands have a circular, rectangular, triangular or polygonal cross-section.

7. A device as disclosed in claim 1, characterised in that it is a part of a transport path for containers in a reverse vending apparatus, and that data concerning the shape and/or colour and/or material type of the container is registered by the reverse vending apparatus upstream in the transport path in relation to the conveyor of the device.

8. A device as disclosed in claim 1, characterised in that said data concerning the container and its bar code data are supplied to a processor in order to determine by processing there whether the container is to be fed on towards the downstream end of the conveyor or laterally displaced away from the conveyor, and whether the container is associated with a refundable deposit, is recyclable, is to be compacted or in another manner further treated.

9. A device for handling containers, e.g., cans made of glass, plastic, wood or metal or bottles of glass or plastic, wherein the containers with the aid of a conveyor are conveyed in lying position past a detector in order to inspect characteristic data about the containers, and means which, on the basis of such data, determines how the containers are to be handled subsequently, e.g., sorted for removal from the conveyor, or conveyed further to the downstream end of the conveyor, and wherein the conveyor has first and second rotatory roller units, a first driving motor being connected to a first of the roller units to cause rotation thereof about its axis of rotation and thereby rotation of the second roller unit about its axis of rotation, by movement of belts or bands which extend continuously about and between the roller units, characterised in that a plurality of adjacently disposed, continuous elastic belts or bands run in grooves on the roller units;

that along a first and a second longitudinal side of the conveyor there are provided respectively a first and a second rotatable roll, wherein the rolls can be made to rotate with the aid of respective first and second roll driving motors about their longitudinal axis in the same direction of rotation, and where the rolls on co-ordinated movement are moveable in the horizontal and vertical directions relative to the conveyor, whereby the rolls are displaceable to a first position wherein they lie substantially laterally outward relative to the container transport path of the conveyor and are spaced apart at first distance, a second position wherein they are located above the conveyor and displaced towards each other so as to be spaced apart at a second distance which is smaller than the width of the conveyor, and a third position wherein the rolls are spaced apart at a third distance which is smaller than or equal to said second distance;

that the detector is a bar code reader located at a distance above the conveyor; and that that at a distance above the conveyor there is also provided a motor-driven sideways displacer for the containers, wherein the displacer consists of a laterally displaceable suspension on which is secured a substantially downward directed pair of plates, wherein the plates are spaced apart at a distance at least equal to the width of the conveyor.

10. A device as disclosed in claim 9, characterised in that the rolls are mounted on a pair of arms which, when the rolls above the conveyor are positioned so as to be spaced apart at said second distance with the aid of a motor-driven arm rotation mechanism, lift the container up from the conveyor and, on rotation of the rolls, cause the container to rotate about its longitudinal axis, so that a bar code located on the container can be read by the bar code reader.

11. A device as disclosed in claim 9 characterised in that each of the roller units is made having a double-cone configuration, a so-called "diabolo" shape.

12. A device as disclosed in claim 9, characterised in that the rolls are driven by respective internally mounted motors.

13. A device as disclosed in claim 9, characterised in that at least one of the driving motor for the roller units, rolls and sideways displacer is a stepping motor.

14. A device as disclosed in claim 9, characterised in that said belts or bands have a circular, rectangular, triangular or polygonal cross-section.

15. A device as disclosed in claim 9, characterised in that it is a part of a transport path for containers in a reverse vending apparatus, and that data concerning the shape and/or colour and/or material type of the container is registered by the reverse vending apparatus upstream in the transport path in relation to the conveyor of the device.

16. A device as disclosed in claim 9, characterised in that said data concerning the container and its bar code data are supplied to a processor in order to determine by processing therein whether the container is to be fed on towards the downstream end of the conveyor or laterally displaced away from the conveyor, and whether the container is associated with a refundable deposit, is recyclable, is to be compacted or in another manner further treated.

* * * * *